(12) United States Patent
Futatsugi et al.

(10) Patent No.: US 11,783,602 B2
(45) Date of Patent: Oct. 10, 2023

(54) OBJECT RECOGNITION SYSTEM, RECOGNITION DEVICE, OBJECT RECOGNITION METHOD, AND OBJECT RECOGNITION PROGRAM

(71) Applicant: NEC Corporation, Tokyo (JP)

(72) Inventors: Yasunori Futatsugi, Tokyo (JP); Yoshihiro Mishima, Tokyo (JP); Atsushi Fukuzato, Tokyo (JP); Jun Nakayamada, Tokyo (JP); Kenji Sobata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 17/288,607

(22) PCT Filed: Sep. 17, 2019

(86) PCT No.: PCT/JP2019/036340
§ 371 (c)(1),
(2) Date: Apr. 26, 2021

(87) PCT Pub. No.: WO2020/095545
PCT Pub. Date: May 14, 2020

(65) Prior Publication Data
US 2021/0390283 A1 Dec. 16, 2021

(30) Foreign Application Priority Data
Nov. 5, 2018 (JP) ................................. 2018-207870

(51) Int. Cl.
*G06V 20/64* (2022.01)
*G06F 18/21* (2023.01)
(Continued)

(52) U.S. Cl.
CPC ............ *G06V 20/64* (2022.01); *G06F 18/217* (2023.01); *G06F 18/2148* (2023.01); *G06F 18/2431* (2023.01); *G06V 20/56* (2022.01)

(58) Field of Classification Search
CPC ... G06V 20/64; G06F 18/2148; G06F 18/217; G06F 18/2431
See application file for complete search history.

(56) References Cited

U.S. PATENT DOCUMENTS

| 11,257,132 | B1 * | 2/2022 | Cornelison | .............. G06N 7/01 |
| 2018/0101741 | A1 | 4/2018 | Arai et al. | |
| 2919/0392347 | | 12/2019 | Yuki | |

FOREIGN PATENT DOCUMENTS

| JP | 2007-006488 A | 1/2007 |
| JP | 2012-150552 A | 8/2012 |

(Continued)

OTHER PUBLICATIONS

International Search Report for PCT Application No. PCT/JP2019/036340, dated Dec. 3, 2019.
(Continued)

*Primary Examiner* — Sam Bhattacharya
(74) *Attorney, Agent, or Firm* — Sughrue Mion, PLLC

(57) ABSTRACT

An object recognition system 80 includes: a recognition device 30 that recognizes an object in an image; and a server 40 that generates a learning model. The recognition device 30 includes: a first object recognition unit 310 that determines a type of the object in the image using the learning model; and an image transmission unit 320 that transmits a type-indeterminable image, which is an image in which the type has not been determined, to the server 40 when an object included in the type-indeterminable image is an object detected as a three-dimensional object. The server 40 includes: a learning device 410 that generates the learning model based on training data in which a teacher label is
(Continued)

assigned to the type-indeterminable image; and a learning model transmission unit 420 that transmits the generated learning model to the recognition device 30. The first object recognition unit 310 determines the type of the object in the image using the transmitted learning model.

10 Claims, 20 Drawing Sheets

(51) Int. Cl.
*G06F 18/214* (2023.01)
*G06F 18/2431* (2023.01)
*G06V 20/56* (2022.01)

(56) References Cited

FOREIGN PATENT DOCUMENTS

| JP | 2018-060466 A | 4/2018 |
| JP | 2018-073275 A | 5/2018 |
| JP | 2018-097506 A | 6/2018 |
| WO | 2018/168515 A | 9/2018 |

OTHER PUBLICATIONS

English translation of Written opinion for PCT Application No. PCT/JP2019/036340, dated Dec. 3, 2019.
Japanese Office Communication for JP Application No. 2020-556651 dated Jun. 21, 2022 with English Translation.

* cited by examiner

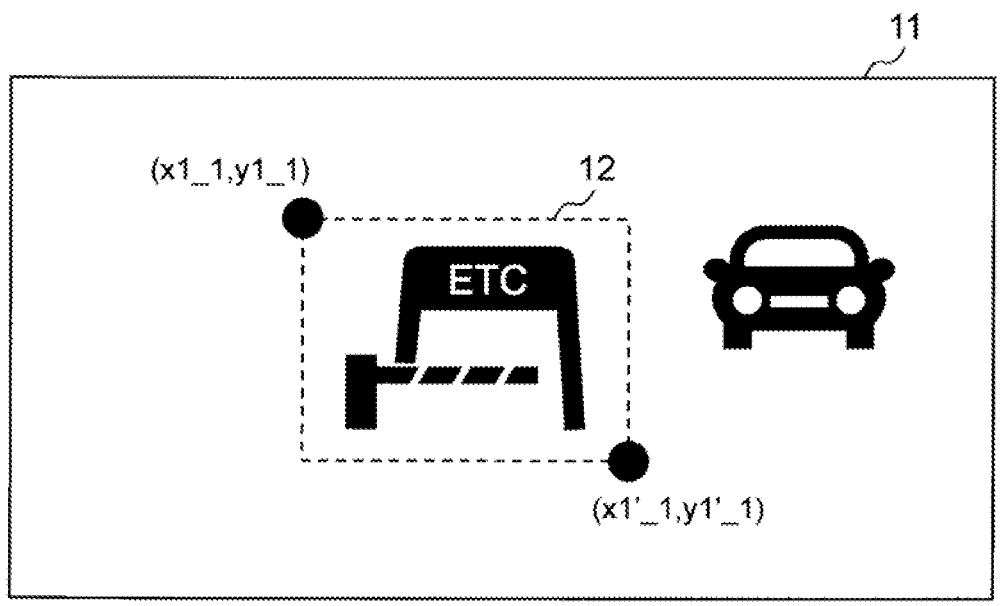

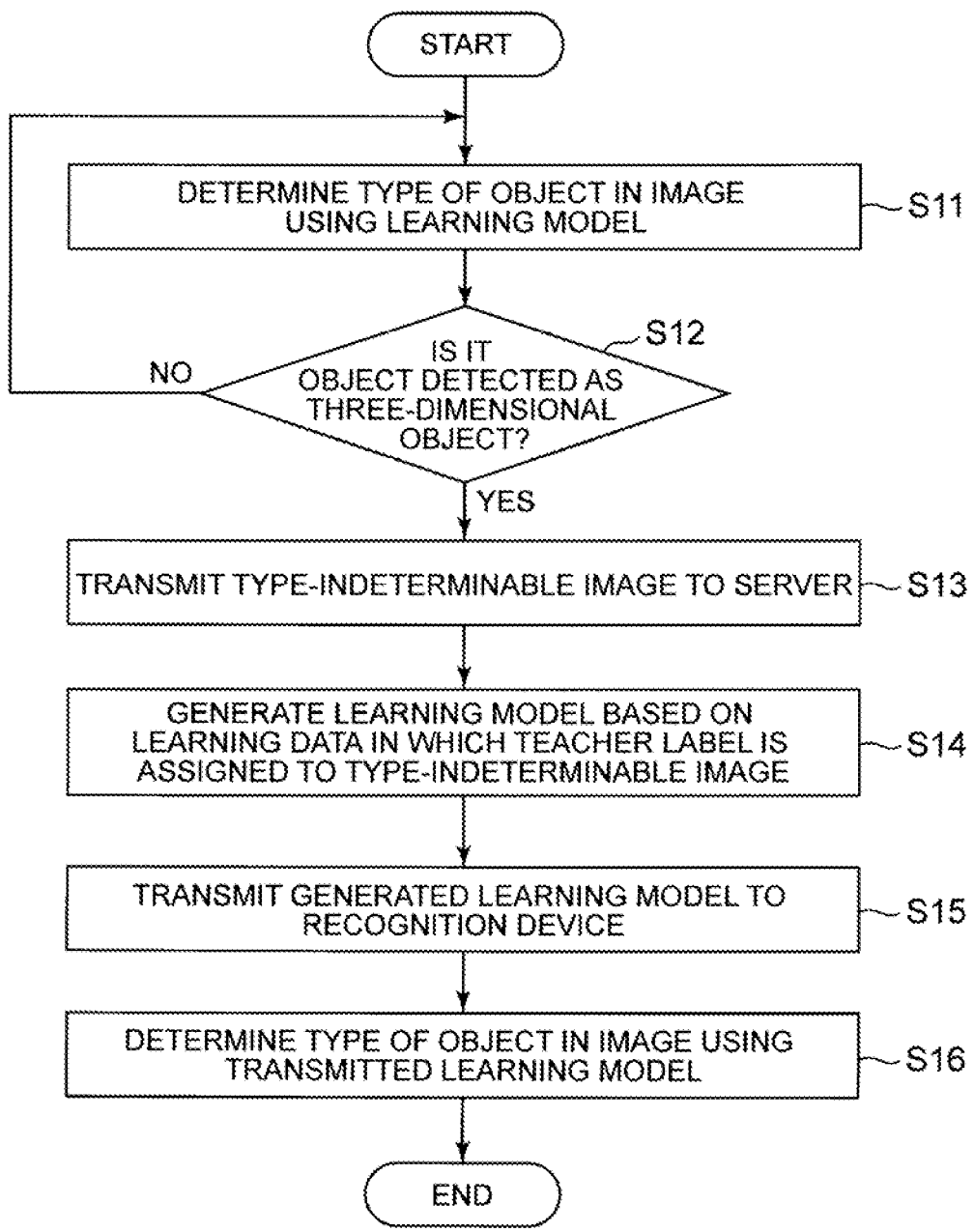

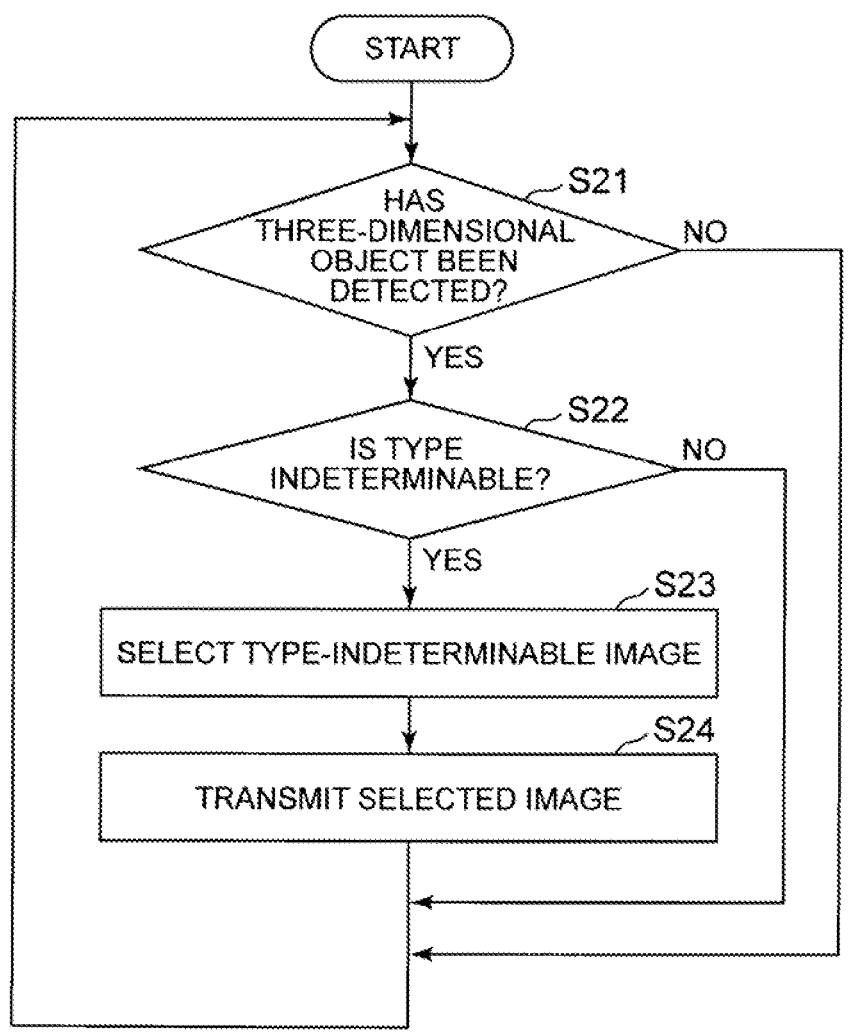

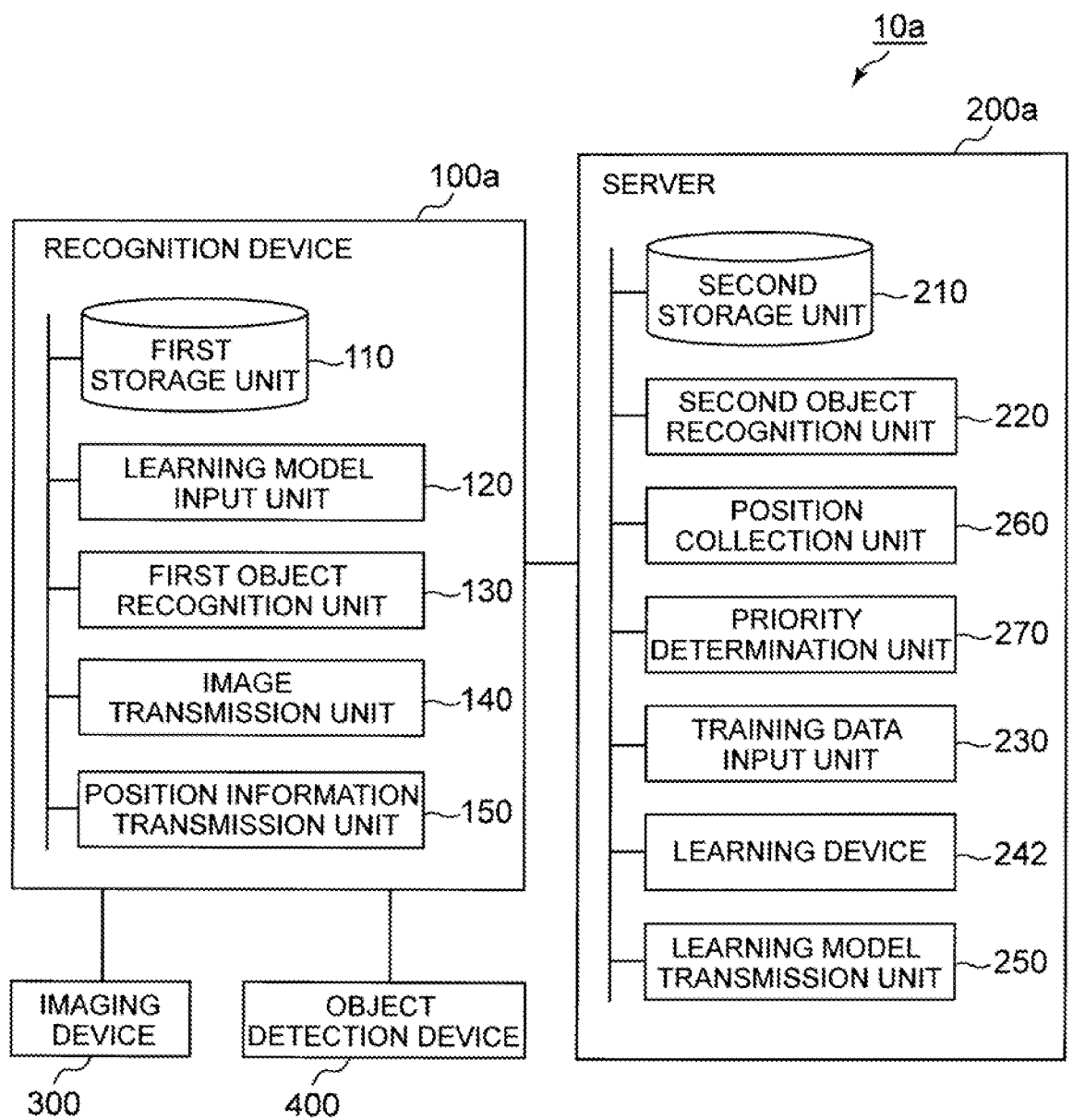

| IMAGE INFORMATION | box COORDINATES OF TYPE-INDETERMINABLE OBJECT | POSITION INFORMATION |
|---|---|---|
| image1.jpg | (x1_1,y1_1,x1'_1,y1'_1) | xx1,yy1 |
| image2.jpg | (x2_1,y2_1,x2'_1,y2'_1)<br>(x2_2,y2_2,x2'_2,y2'_2) | xx2,yy2 |
| ⋮ | ⋮ | ⋮ |

FIG. 15

| IMAGE INFORMATION | box COORDINATES OF TYPE-INDETERMINABLE OBJECT | POSITION INFORMATION | TIME INFORMATION |
|---|---|---|---|
| image1.jpg | (x1_1,y_1,x'_1,y'_1) | xx1,yy1 | DAY d1, MONTH p1, YEAR z1, HOUR h1, MINUTE m1, SECOND s1 |
| image2.jpg | (x2_1,y2_1,x2'_1,y2'_1) (x2_2,y2_2,x2'_2,y2'_2) | xx2,yy2 | DAY d2, MONTH p2, YEAR z2, HOUR h2, MINUTE m2, SECOND s2 |
| ⋮ | ⋮ | ⋮ | ⋮ |

FIG. 16

| | PRIORITY POLICY | AIM OF LEARNING |
|---|---|---|
| 32 | ADD HIGH-PRIORITY FLAG TO IMAGE BELONGING TO GROUP WHOSE DURATION OF TIME INFORMATION IS THREE DAYS OR MORE | PREFERENTIALLY LEARN STATIONARY OBJECT |
| 31 | ADD HIGH-PRIORITY FLAG TO IMAGE BELONGING TO GROUP WHOSE DURATION OF TIME INFORMATION IS WITHIN ONE MINUTE | PREFERENTIALLY LEARN VARIABLE OBJECT |

OBJECT RECOGNITION SYSTEM, RECOGNITION DEVICE, OBJECT RECOGNITION METHOD, AND OBJECT RECOGNITION PROGRAM

This application is a National Stage Entry of PCT/JP2019/036340 filed on Sep. 17, 2019, which claims priority from Japanese Patent Application 2018-207870 filed on Nov. 5, 2018, the contents of all of which are incorporated herein by reference, in their entirety.

TECHNICAL FIELD

The present invention relates to an object recognition system, a recognition device, an object recognition method, a learning model update method, and an object recognition program that improve the recognition accuracy of an object that is difficult to determine.

BACKGROUND ART

In recent years, automatic driving techniques for automating driving by a driver and danger prediction techniques for predicting danger during driving have attracted attention. Various methods have been proposed for recognizing an object by capturing an image of the outside of a vehicle (hereinafter referred to as the outside of the vehicle) in order to perform the automatic driving and danger prediction.

For example, PTL 1 describes an image recognition device that recognizes information required for driving assistance and automatic driving while reducing a calculation load. The device described in PTL 1 detects a stationary object as a target for image recognition processing based on three-dimensional map data in which position information on the stationary object on the outside of a vehicle is set, and relative position and distance between the vehicle and the stationary object, and performs the image recognition processing by narrowing down a range in which the detected target is included.

CITATION LIST

Patent Literature

PTL 1: Japanese Patent Application Laid-Open No. 2018-73275

SUMMARY OF INVENTION

Technical Problem

There is a case where a new recognition target object, such as a sign and a building, is installed along with the passage of time. It is difficult to recognize an unknown object, and there is also a case where the object is not properly recognizable depending on a shape of the recognition target or an observation direction. Therefore, it is difficult to determine a type of the object even if the object itself can be detected. In a method described in PTL 1, it is difficult to detect the stationary object as the target for image recognition processing unless the three-dimensional map data is updated, and it is also difficult to take an object that is temporarily installed into consideration.

Therefore, an object of the present invention is to provide an object recognition system, a recognition device, an object recognition method, a learning model update method, and an object recognition program capable of improving the recognition accuracy of an object when the object whose type is indeterminable is detected.

Solution to Problem

An object recognition system according to the present invention includes: a recognition device that recognizes an object in a captured image; and a server that generates a learning model. The recognition device includes: a first object recognition unit that determines a type of the object in the image using the learning model; and an image transmission unit that transmits a type-indeterminable image, which is an image in which the type has not been determined, to the server when the object included in the type-indeterminable image is an object detected as a three-dimensional object. The server includes: a learning device that generates a learning model based on training data in which a teacher label is assigned to the type-indeterminable image; and a learning model transmission unit that transmits the generated learning model to the recognition device. The first object recognition unit of the recognition device determines the type of the object in the image using the transmitted learning model.

A recognition device according to the present invention includes: an object recognition unit that determines a type of an object in an image using a learning model; and an image transmission unit that transmits a type-indeterminable image, which is an image in which the type has not been determined, to a server that generates the learning model when an object included in the type-indeterminable image is an object detected as a three-dimensional object. The object recognition unit receives the learning model generated by the server based on training data in which a teacher label is assigned to the type-indeterminable image, and determines the type of the object in the image using the received learning model.

An object recognition method according to the present invention includes: causing a recognition device that recognizes an object in a captured image to determine a type of the object in the image using a learning model; causing the recognition device to transmit a type-indeterminable image, which is an image in which the type has not been determined, to a server that generates the learning model when an object included in the type-indeterminable image is an object detected as a three-dimensional object; causing the server to generate a learning model based on training data in which a teacher label is assigned to the type-indeterminable image; causing the server to transmit the generated learning model to the recognition device; and causing the recognition device to determine the type of the object in the image using the transmitted learning model.

A learning model update method according to the present invention includes: determining a type of an object in an image using a learning model; transmitting a type-indeterminable image, which is an image in which the type has not been determined, to a server that generates the learning model when an object in the type-indeterminable image is an object detected as a three-dimensional object; receiving the learning model generated by the server based on training data in which a teacher label is assigned to the type-indeterminable image; and determining the type of the object in the image using the received learning model.

An object recognition program according to the present invention causes a computer to execute: an object recognition process of determining a type of an object in an image using a learning model; and an image transmission process of transmitting a type-indeterminable image, which is an image in which the type has not been determined, to a server that generates the learning model when an object included in the type-indeterminable image is an object detected as a three-dimensional object. In the object recognition process, the learning model, generated by the server based on the training data in which a teacher label is assigned to the type-indeterminable image, is received, and the type of the object in the image is determined using the received learning model.

Advantageous Effects of Invention

According to the present invention, the recognition accuracy of the object whose type is indeterminable can be improved when the object is detected.

BRIEF DESCRIPTION OF DRAWINGS

FIG. 3 It depicts an explanatory view illustrating an example of a method for identifying a type-indeterminable image.

FIG. 4 It depicts an explanatory view illustrating an example of information on the type-indeterminable image transmitted to a server.

FIG. 5 It depicts a flowchart illustrating an operation example of the object recognition system of the first exemplary embodiment.

FIG. 6 It depicts a flowchart illustrating an operation example of an image transmission unit of the first exemplary embodiment.

FIG. 7 It depicts a block diagram illustrating a configuration example of a second exemplary embodiment of the object recognition system according to the present invention.

FIG. 15 It depicts an explanatory view illustrating another example of information transmitted to a server.

FIG. 16 It depicts an explanatory view illustrating an example of a priority policy.

DESCRIPTION OF EMBODIMENTS

Hereinafter, exemplary embodiments of the present invention will be described with reference to the accompanying drawings.

First Exemplary Embodiment

Figure 1:
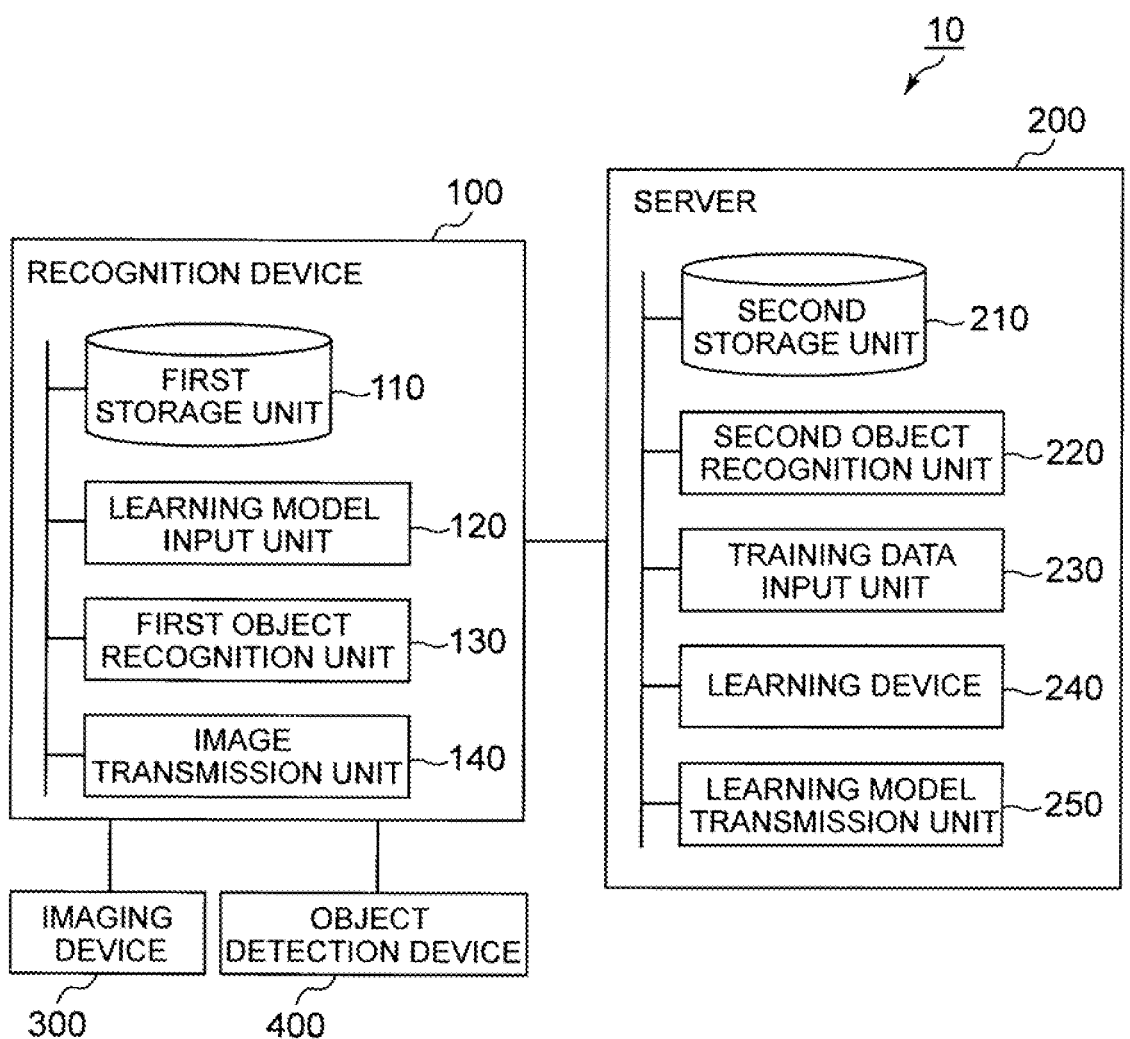
FIG. 1 It depicts a block diagram illustrating a configuration example of a first exemplary embodiment of an object recognition system according to the present invention.
Figure 2:
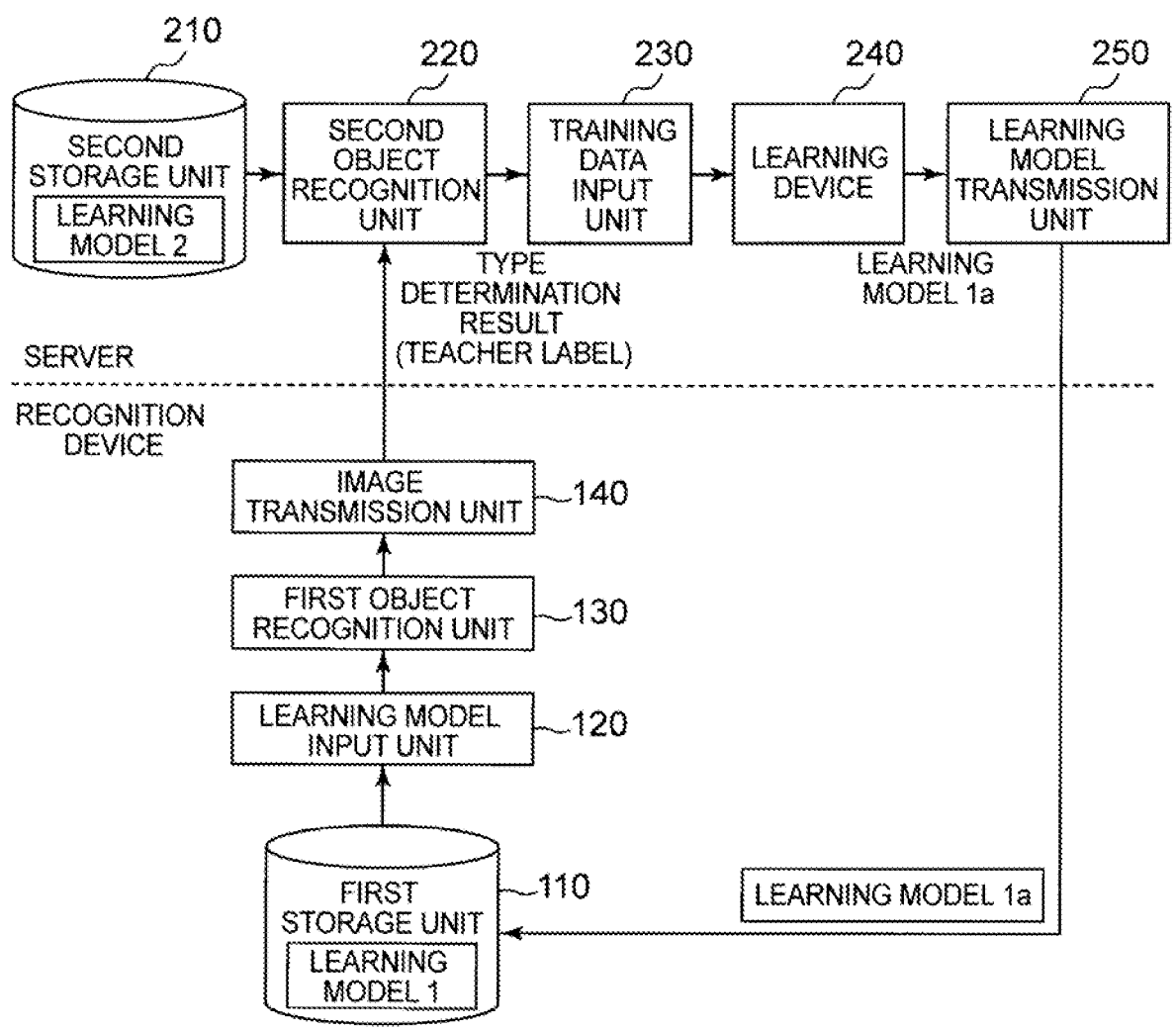
FIG. 2 It depicts an explanatory diagram illustrating an operation example of the object recognition system according to the present invention.

FIG. 1 is a block diagram illustrating a configuration of a first exemplary embodiment of an object recognition system according to the present invention. In addition, FIG. 2 is an explanatory diagram illustrating an operation example of the object recognition system according to the present invention. An object recognition system 10 of the present exemplary embodiment includes a recognition device 100 and a server 200. The recognition device 100 is mounted on, for example, a vehicle and recognizes an object in an image captured by an imaging device 300, which will be described later, using a learning model.

The recognition device 100 includes a first storage unit 110, a learning model input unit 120, a first object recognition unit 130, and an image transmission unit 140. The recognition device 100 is connected to the imaging device 300 and receives an input of the image captured by the imaging device 300. In addition, the recognition device 100 is connected to an object detection device 400, and receives an input of a three-dimensional object detection result detected by the object detection device 400 to be described later.

The imaging device 300 captures an image of the outside of the vehicle. A timing at which the imaging device 300 captures an image may be any timing during traveling or stop of the vehicle. The imaging device 300 may capture an image every predetermined period, or may capture an image in response to an instruction from a driver or the like or a control device. The imaging device 300 is, for example, an in-vehicle camera that captures a landscape outside the vehicle.

The object detection device 400 detects an object existing in a range to be captured by the imaging device 300. Specific examples of the object detection device 400 include a millimeter-wave radar that detects millimeter-wave information, and laser imaging detection and ranging (LiDAR) that acquires a distance to a target, a stereo camera that captures a peripheral image, and the like. Note that it is assumed that an image as object recognition target is captured by the imaging device 300 in the present exemplary embodiment.

The first storage unit 110 stores a learning model used by the first object recognition unit 130 when determining a type of an object. In addition, the first storage unit 110 stores information required when the recognition device 100 performs processing. The first storage unit 110 is realized by, for example, a magnetic disk device.

The learning model input unit 120 receives a learning model input from the server 200 to be described later. The learning model input unit 120 may store the received learning model in the first storage unit 110 or may input the received learning model to the first object recognition unit 130.

The first object recognition unit 130 determines a type of an object in an image captured by the imaging device 300 using a learning model. A method by which the first object recognition unit 130 determines the type of the object from the image is arbitrary, and may be determined according to the learning model to be used. Note that the method for determining the type of the object using the learning model is widely known, and the detailed description thereof will be omitted here. Note that the learning model used by the first object recognition unit 130 for the object determination in the initial state is referred to as "learning model 1" in order to facilitate understanding of the present exemplary embodiment.

In addition, the first object recognition unit 130 of the present exemplary embodiment identifies an image of an object whose type has not been determined. Hereinafter, the image of the object whose type has not been determined is referred to as a type-indeterminable image. For example, the first object recognition unit 130 may identify an image in which a type of an object has not been uniquely determined as the type-indeterminable image, or may identify an image whose plausibility of a type is lower than a reference value as the type-indeterminable image.

In addition, a method by which the first object recognition unit 130 identifies the type-indeterminable image is also arbitrary. The first object recognition unit 130 may identify the type-indeterminable image based on, for example, an image set as a recognition target and information indicating a range of an object in the image (for example, coordinates to identify a rectangle). FIG. 3 is an explanatory view illustrating an example of the method for identifying the type-indeterminable image. The example illustrated in FIG. 3 illustrates that an image 11 set as the recognition target is "image1.jpg", and the range is identified using an upper left coordinate (x1_1, y1_1) and a lower right coordinate (x1'_1, y1'_1) of the object included in the image. In addition, the first object recognition unit 130 may identify a new image 12, generated by extracting the identified range from the image set as the recognition target, as the type-indeterminable image.

The image transmission unit 140 receives an object recognition result from the first object recognition unit 130. Specifically, the image transmission unit 140 receives the type-indeterminable image from the first object recognition unit 130. In addition, the image transmission unit 140 receives a three-dimensional object detection result from the object detection device 400. Specifically, the image transmission unit 140 detects an object existing in a range captured by the imaging device 300 based on the three-dimensional object detection result.

Then, the image transmission unit 140 determines whether the object in the image in which the object type has not been determined (that is, the type-indeterminable image) is an object detected as a three-dimensional object. When the object in the type-indeterminable image is the object detected as the three-dimensional object, the image transmission unit 140 transmits the type-indeterminable image to the server 200.

For example, in the example illustrated in FIG. 3, it is assumed that a type of electronic toll collection system (ETC) gate included in the image 12 is indeterminable, but the ETC gate is detected as some kind of three-dimensional object. In this case, the image transmission unit 140 transmits a type-indeterminable image including this ETC gate to the server 200. In this manner, the image transmission unit 140 transmits the type-indeterminable image including the object detected as the three-dimensional object to the server 200.

FIG. 4 is an explanatory view illustrating an example of information on a type-indeterminable image transmitted to the server. The example illustrated in FIG. 4 illustrates that a type-indeterminable image in which a captured image as a recognition target is associated with box coordinates of a type-indeterminable object is transmitted to the server 200. For example, data on the first line illustrated in FIG. 4 indicates that there is one object whose type has not been determined, and data on the second line indicates that there are two objects whose types have not been determined. In this manner, the image transmission unit 140 may transmit a plurality of type-indeterminable images for one captured image.

The server 200 includes a second storage unit 210, a second object recognition unit 220, a training data input unit 230, a learning device 240, and a learning model transmission unit 250. The server 200 is connected to be capable of communicating with the recognition device 100, and may be realized as a part of a cloud service, for example.

The second storage unit 210 stores a learning model used by the second object recognition unit 220 for object determination. In addition, the second storage unit 210 stores information required when the server 200 performs processing. The second storage unit 210 is realized by, for example, a magnetic disk device.

The second object recognition unit 220 determines a type of an object in a type-indeterminable image received from the recognition device 100 using the learning model stored in the second storage unit 210. A method by which the second object recognition unit 220 determines the type of the object from the image is also arbitrary, and may be determined according to the learning model to be used. In the present exemplary embodiment, the second object recognition unit 220 makes a determination using a model having higher object recognition accuracy than the first object recognition unit 130. That is, there is a possibility that the second object recognition unit 220 can determine a type of an object whose type has not been determined by the first object recognition unit 130. Hereinafter, the learning model used by the second object recognition unit 220 for the determination is also referred to as "learning model 2".

Note that a correct label may be manually assigned to a type-indeterminable image, instead of the determination on the object type performed by the second object recognition unit 220 from the viewpoint of assigning the appropriate correct label to the object in the type-indeterminable image. In this case, the server 200 does not necessarily include the second storage unit 210 and the second object recognition unit 220. Note that it is more preferable that the server 200 include the second storage unit 210 and the second object recognition unit 220 since a determination process after transmission of a type-indeterminable image can be automated.

The training data input unit 230 inputs training data used by the learning device 240 for learning. The training data input unit 230 may input training data in which a type-indeterminable image and a determination result obtained by the second object recognition unit 220 are associated with each other, or may input training data in which a correct label is manually assigned in the type-indeterminable image.

Based on the input training data, the learning device 240 performs additional learning of a learning model used by the first object recognition unit 130 of the recognition device 100 to determine a type of an object. A method by which the learning device 240 generates a learning model (performs the additional learning) based on the training data is arbitrary, and a widely known method may be used. The learning model generated by the learning device 240 is hereinafter referred to as "learning model 1a". Since "learning model 1a" is a newly generated model as compared with "learning model 1", "learning model 1" and "learning model 1a" can be also referred to as an existing model, and an updated model, respectively.

The learning model transmission unit 250 transmits the learning model generated by the learning device 240 to the recognition device 100.

Thereafter, when the learning model input unit 120 receives the transmitted learning model, the first object recognition unit 130 determines a type of an object in an image captured by the imaging device 300 using the received learning model (that is, "learning model 1a"). The learning model 1a is a model generated using training data in which a correct label is assigned to an image in which a type of an object has not been determined by the learning model 1 (that is, the type-indeterminable image). It can be said that this model is a model with an increased possibility of enabling determination even for an object whose type is indeterminable by the existing model. Therefore, the replacement with this model enables improvement of the recognition accuracy for an object whose type was indeterminable in the past.

The learning model input unit 120, the first object recognition unit 130, and the image transmission unit 140 are realized by a CPU which is a computer that operates according to a program (object recognition program). For example, the program may be stored in the first storage unit 110 of the recognition device 100, and the CPU may read the program to operate as the learning model input unit 120, the first object recognition unit 130, and the image transmission unit 140 according to the program. In addition, each of the learning model input unit 120, the first object recognition unit 130, and the image transmission unit 140 may be realized by dedicated hardware.

In addition, the second object recognition unit 220, the training data input unit 230, the learning device 240, and the learning model transmission unit 250 are realized by a CPU which is a computer that operates according to a program (re-learning program). For example, the program may be stored in the second storage unit 210 of the server 200, and the CPU may read the program to operate as the second object recognition unit 220, the training data input unit 230, the learning device 240, and the learning model transmission unit 250 according to the program. In addition, each of the second object recognition unit 220, the training data input unit 230, the learning device 240, and the learning model transmission unit 250 may be realized by dedicated hardware.

Next, an operation of the object recognition system 10 of the present exemplary embodiment will be described. FIG. 5 is a flowchart illustrating an operation example of the object recognition system 10 according to the present exemplary embodiment. The first object recognition unit 130 of the recognition device 100 determines a type of an object in an image using a learning model (Step S11). The image transmission unit 140 determines whether an object included in an image in which a type has not been determined (that is, a type-indeterminable image) is an object detected as a three-dimensional object (Step S12). When the object is the object detected as the three-dimensional object (Yes in Step S12), the image transmission unit 140 transmits the type-indeterminable image to the server 200 (Step S13). On the other hand, when the object is not the object detected as the three-dimensional object (No in Step S12), the processes of Step S11 and the subsequent steps are repeated.

The learning device 240 of the server 200 generates a learning model based on training data in which a teacher label is assigned to the type-indeterminable image transmitted from the recognition device 100 (Step S14). The learning model transmission unit 250 transmits the generated learning model to the recognition device 100 (Step S15). The first object recognition unit 130 of the recognition device 100 determines the type of the object in the image using the transmitted learning model (Step S16).

Next, an operation of the image transmission unit 140 of the present exemplary embodiment will be described. The image transmission unit 140 selects an image in which a three-dimensional object has been detected by millimeter waves, a LiDAR, or the like but a type of an object is indeterminable and uploads (transmits) the image to the server 200. FIG. 6 is a flowchart illustrating an operation example of the image transmission unit 140 of the present exemplary embodiment. The image transmission unit 140 determines whether a three-dimensional object has been detected (Step S21). When no three-dimensional object has been detected (No in Step S21), the processes of Step S21 and the subsequent steps are repeated.

On the other hand, when the three-dimensional object has been detected (Yes in Step S21), the image transmission unit 140 determines whether a type of an object in an image has not been determined (Step S22). When the type has been determined (No in Step S22), the processes of Step S21 and the subsequent steps are repeated. On the other hand, when the type has not been determined (Yes in Step S22), the image transmission unit 140 selects a type-indeterminable image out of an image as a recognition target (Step S23), and transmits the selected image to the server 200 (Step S24).

As described above, in the recognition device 100 of the present exemplary embodiment, the first object recognition unit 130 determines the type of the object in the image using the learning model, and the image transmission unit 140 transmits the type-indeterminable image to the server 200 when the object included in the type-indeterminable image is the object detected as the three-dimensional object. On the other hand, in the server 200, the learning device 240 generates the learning model based on the training data in which the teacher label is assigned to the type-indeterminable image, and the learning model transmission unit 250 transmits the generated learning model to the recognition device 100. Then, the first object recognition unit 130 of the recognition device 100 determines the type of the object in the image using the transmitted learning model.

Therefore, when an object whose type is indeterminable has been detected, the recognition accuracy of the object can be improved. Specifically, a type of an unknown object whose type has not been determined can be determined.

Second Exemplary Embodiment

Next, a second exemplary embodiment of the object recognition system according to the present invention will be described. In the second exemplary embodiment, a method of selecting data preferentially used in learning by using position information on a location where an image has been captured will be described. FIG. 7 is a block diagram illustrating a configuration example of the second exemplary embodiment of the object recognition system according to the present invention. An object recognition system 10a of the present exemplary embodiment includes a recognition device 100a and a server 200a.

The recognition device 100a includes the first storage unit 110, the learning model input unit 120, the first object recognition unit 130, the image transmission unit 140, and a position information transmission unit 150. That is, the recognition device 100a of the present exemplary embodiment further includes the position information transmission unit 150 as compared with the recognition device 100 of the first exemplary embodiment. The other configurations are the same as those in the first exemplary embodiment.

The position information transmission unit 150 transmits, to the server 200a, position information on a location where an image of an object whose type has not been determined has been captured (that is, the location where a type-indeterminable image has been captured). Note that, instead of the position information transmission unit 150, the image transmission unit 140 may transmit the position information to the server 200a together with the type-indeterminable image. In this case, the recognition device 100a does not necessarily include the position information transmission unit 150.

Figures 8, 9:
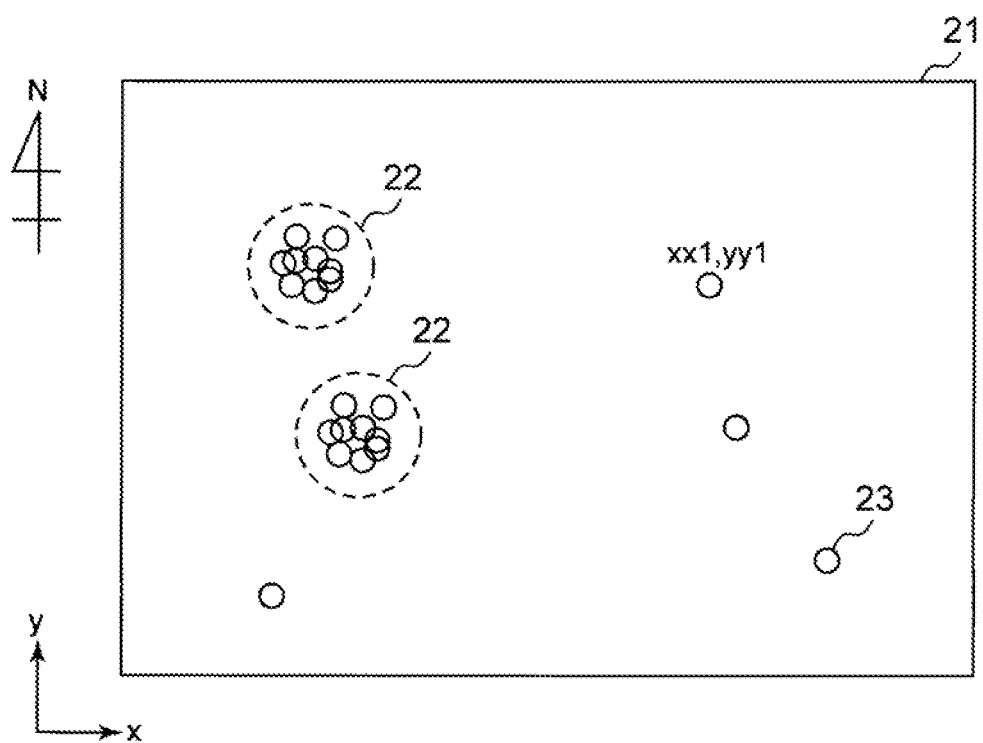
FIG. 8 It depicts an explanatory view illustrating an example of information transmitted to a server.
FIG. 9 It depicts an explanatory view illustrating an example of a process of collecting position information.

FIG. 8 is an explanatory view illustrating an example of information transmitted to the server. The position information illustrated in FIG. 8 indicates that the position information is transmitted in association with the type-indeterminable image illustrated in FIG. 4.

The server 200a includes the second storage unit 210, the second object recognition unit 220, the training data input unit 230, a learning device 242, the learning model transmission unit 250, a position collection unit 260, and a priority determination unit 270. That is, the server 200a of the present exemplary embodiment further includes the position collection unit 260 and the priority determination unit 270 as compared with the server 200 of the first exemplary embodiment, and includes the learning device 242, instead of the learning device 240. The other configurations are the same as those in the first exemplary embodiment.

The position collection unit 260 collects position information received from the recognition device 100a. Specifically, the position collection unit 260 collects the pieces of position information in which positions are close to each other in a group, and identifies a location (hereinafter, also referred to as a dense location) where type-indeterminable images have been captured more than a predetermined standard. The position collection unit 260 may identify, for example, a location where capturing has been performed such that the number of pieces of grouped position information is larger than a predetermined threshold. A method for grouping pieces of adjacent position information is arbitrary, and a generally known method, such as a clustering method, may be used.

FIG. 9 is an explanatory view illustrating an example of a process of collecting position information. A rectangle 21 illustrated in FIG. 9 is an image of a map which two-dimensionally represents positions of objects whose types have not been determined, and a circle in the rectangle 21 indicates a position where an object whose type is indeterminable has been detected (that is, a position where a type-indeterminable image has been captured).

In the example illustrated in FIG. 9, the position collection unit 260 groups pieces of position information in a range where the circles are dense, and identifies two groups 22. This group 22 indicates a location where an object whose type is indeterminable has been captured a plurality of times. Note that position information 23 illustrated in FIG. 9 indicates a location where an object whose type is indeterminable has been captured only once, and can be also said as a location where the number of times of capturing is sparse.

The priority determination unit 270 determines a priority of a type-indeterminable image captured at a location indicated by position information to be higher as the collected position information is more. This priority is a value indicating a priority of data used by the learning device 240 for learning. Specifically, the priority determination unit 270 determines a priority of a type-indeterminable image captured at a location indicated by grouped position information to be higher than a priority of a type-indeterminable image captured at a location indicated by ungrouped position information. For example, the priority determination unit 270 may assign a flag (high-priority flag) indicating that the priority is high to training data.

Further, the priority determination unit 270 may rank a priority according to the number of pieces of grouped position information. Specifically, a high priority may be determined for a group with a large number of pieces of position information belonging to the group, among the pieces of grouped position information.

In the example illustrated in FIG. 9, the priority determination unit 270 determines a priority of a type-indeterminable image captured at a location indicated by position information belonging to the group 22 to be higher than a priority of the type-indeterminable image captured at a location indicated by the position information 23. In this case, the priority determination unit 270 may assign a high-priority flag to training data corresponding to the position information belonging to the group 22, for example.

The learning device 242 generates a learning model preferentially using the training data including the type-indeterminable image with a higher priority. Note that the training data input unit 230 may control the training data input to the learning device 242 according to the priority.

The learning model input unit 120, the first object recognition unit 130, the image transmission unit 140, and the position information transmission unit 150 are realized by a CPU which is a computer that operates according to a program (object recognition program). In addition, the second object recognition unit 220, the training data input unit 230, the learning device 242, the learning model transmission unit 250, the position collection unit 260, and the priority determination unit 270 are realized by a CPU which is a computer that operates according to a program (re-learning program).

Next, an operation of the object recognition system 10a of the present exemplary embodiment will be described. FIG.

10 is a flowchart illustrating an operation example of the object recognition system 10a according to the present exemplary embodiment. The processing until transmission of a type-indeterminable image to the server is the same as the processing from Step S11 to Step S13 illustrated in FIG. 5. In the present exemplary embodiment, the position information transmission unit 150 further transmits position information on a location where the type-indeterminable image has been captured to the server 200a (Step S21).

The position collection unit 260 collects position information received from the recognition device 100a (Step S22). Then, the priority determination unit 270 determines a priority of a type-indeterminable image captured at a location indicated by collected position information to be higher as the position information is more (Step S23). The learning device 242 generates a learning model preferentially using the training data including the type-indeterminable image with a higher priority (Step S24). Thereafter, the processing until a recognition process is performed after transmission of the generated learning model to the recognition device is the same as the processing from Step S15 to Step S16 illustrated in FIG. 5.

As described above, the position information transmission unit 150 transmits the position information on the location where the type-indeterminable image has been captured to the server 200a in the present exemplary embodiment. The position collection unit 260 collects the received position information, and the priority determination unit 270 determines a priority of a type-indeterminable image captured at a location indicated by position information to be higher as the collected position information is more. Then, the learning device 242 generates the learning model preferentially using the training data including the type-indeterminable image with the higher priority. Accordingly, it is possible to reduce a frequency of additional learning of an object whose type has not been determined accidentally, and to preferentially learn an object whose type has not been determined by a plurality of vehicles, in addition to an effect of the first exemplary embodiment.

Third Exemplary Embodiment

Figure 11:
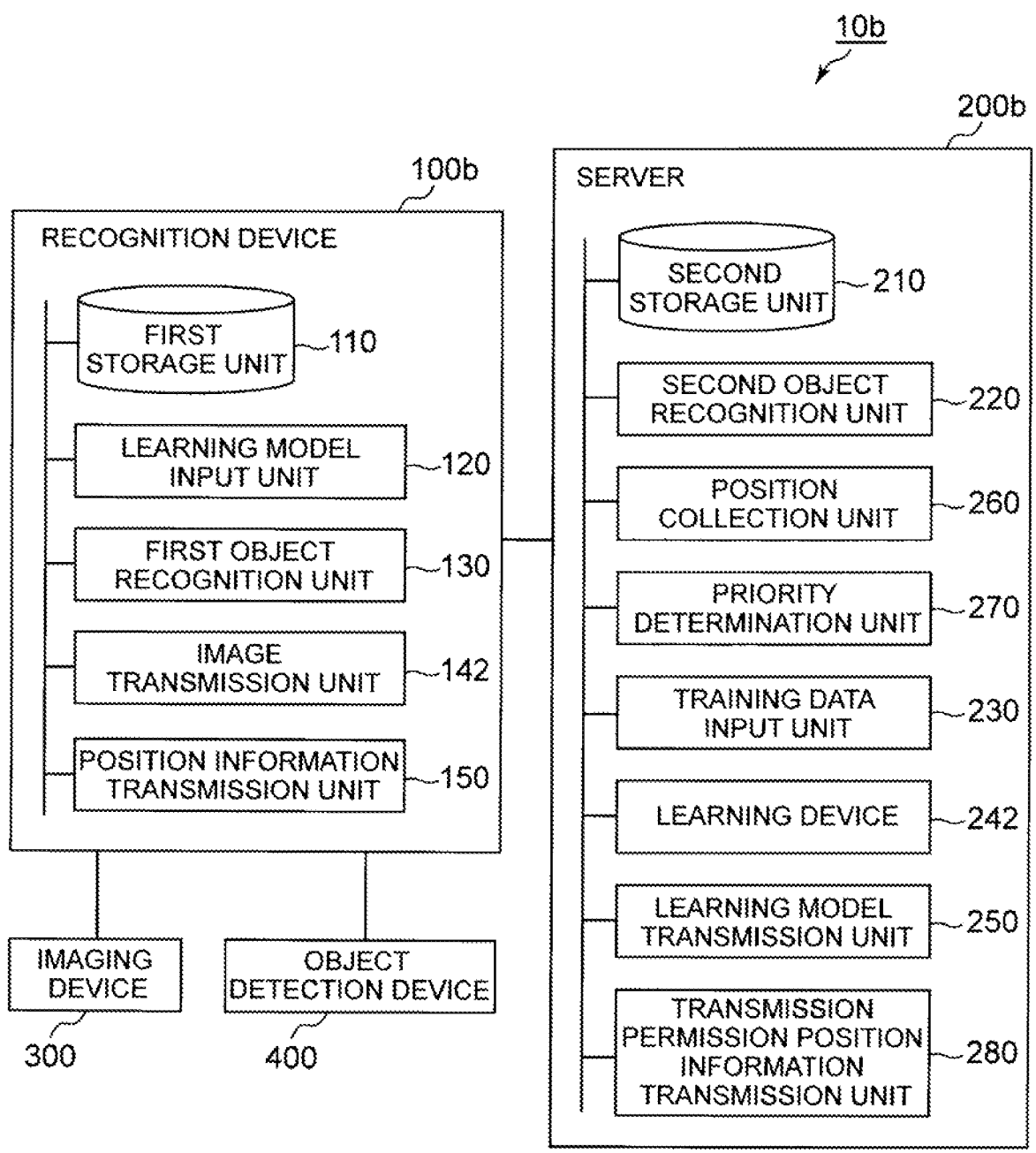
FIG. 11 It depicts a block diagram illustrating a configuration example of a third exemplary embodiment of the object recognition system according to the present invention.

Next, a third exemplary embodiment of the object recognition system according to the present invention will be described. In the second exemplary embodiment, the location (dense location) where a large number of objects whose types are indeterminable have been captured is identified based on the position information. In the present exemplary embodiment, a method of limiting a type-indeterminable image transmitted to a server will be described. FIG. 11 is a block diagram illustrating a configuration example of the third exemplary embodiment of the object recognition system according to the present invention. The object recognition system 10b of the present exemplary embodiment includes a recognition device 100b and a server 200b.

The server 200b includes the second storage unit 210, the second object recognition unit 220, the training data input unit 230, the learning device 242, the learning model transmission unit 250, the position collection unit 260, the priority determination unit 270, and a transmission permission position information transmission unit 280. That is, the server 200b of the present exemplary embodiment further includes the transmission permission position information transmission unit 280 as compared with the server 200a of the second exemplary embodiment. The other configurations are the same as those in the second exemplary embodiment.

The position collection unit 260 collects pieces of position information in which positions are close to each other in a group, and identifies a location (that is, dense location) where type-indeterminable images have been captured more than a predetermined standard, which is similar to the second exemplary embodiment. In other words, the location (dense location) where capturing has been performed more frequently than a predetermined standard can be also said as a location where the number of pieces of grouped position information is larger than the predetermined standard.

The transmission permission position information transmission unit 280 transmits, to the recognition device 100b, position information (hereinafter, referred to as transmission permission position information) indicating a capturing location of a type-indeterminable image for which transmission to the server 200b is permitted. Specifically, the transmission permission position information transmission unit 280 transmits the position information indicating the dense location identified by the position collection unit 260 to the recognition device 100b as the transmission permission position information.

The recognition device 100b includes the first storage unit 110, the learning model input unit 120, the first object recognition unit 130, an image transmission unit 142, and the position information transmission unit 150. That is, the recognition device 100b of the present exemplary embodiment includes the image transmission unit 142, instead of the image transmission unit 140, as compared with the recognition device 100a of the second exemplary embodiment. The other configurations are the same as those in the second exemplary embodiment.

The image transmission unit 142 suppresses transmission of a type-indeterminable image captured at a location other than the location indicated by the transmission permission position information to the server 200b. In other words, the image transmission unit 142 transmits only the type-indeterminable image captured at the location indicated by the transmission permission position information to the server 200b. Therefore, the type-indeterminable image captured at the location indicated by the transmission permission position information is collected on the server 200b.

Figure 12:
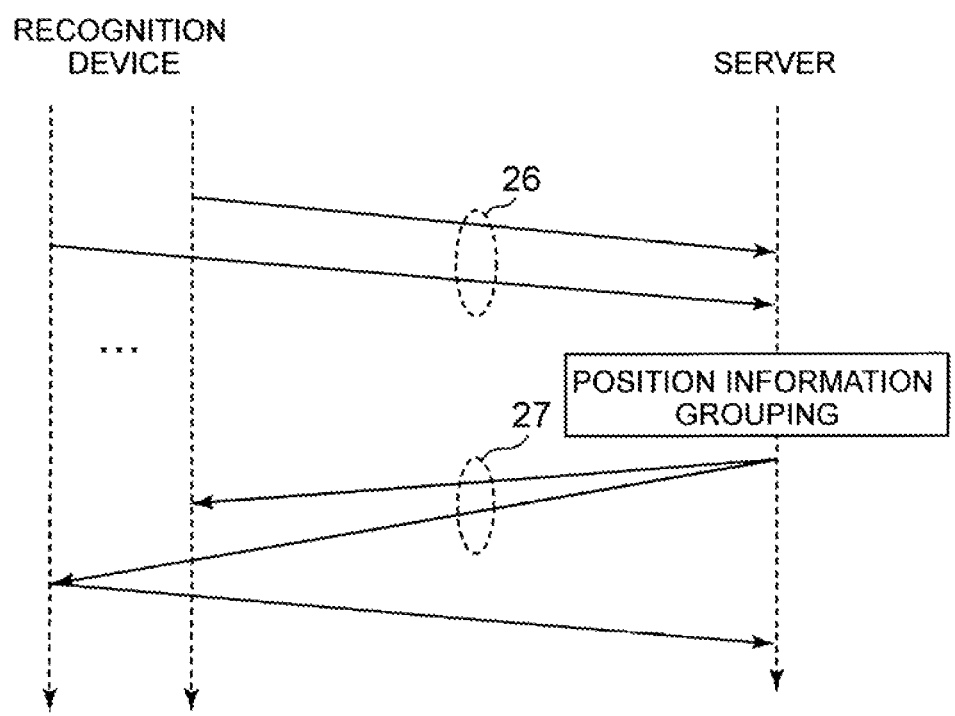
FIG. 12 It depicts an explanatory view illustrating an example of a process of controlling transmission of a type-indeterminable image based on transmission permission position information.

FIG. 12 is an explanatory view illustrating an example of a process of controlling transmission of a type-indeterminable image based on transmission permission position information. First, the recognition device 100b (more specifically, the position information transmission unit 150) sequentially transmits position information 26 indicating a location where a type-indeterminable image has been captured to the server 200b. The server 200b (more specifically, the position collection unit 260) groups pieces of transmitted position information and transmits position information 27 indicating a grouped location to the recognition device 100b.

This information corresponds to the transmission permission position information. The recognition device 100b (more specifically, the image transmission unit 142) transmits a type-indeterminable image to the server 200b based on the transmission permission position information.

In this manner, only images at the location where many type-indeterminable images have been captured are limitedly transmitted to the server 200b, and thus, the learning device 242 can efficiently perform additional learning while reducing the amount of information uploaded to the server 200b.

The learning model input unit 120, the first object recognition unit 130, the image transmission unit 142, and the position information transmission unit 150 are realized by a CPU which is a computer that operates according to a program (object recognition program). In addition, the second object recognition unit 220, the training data input unit 230, the learning device 242, the learning model transmission unit 250, the position collection unit 260, the priority determination unit 270, and the transmission permission position information transmission unit 280 are realized by a CPU which is a computer that operates according to a program (re-learning program).

Figure 10:
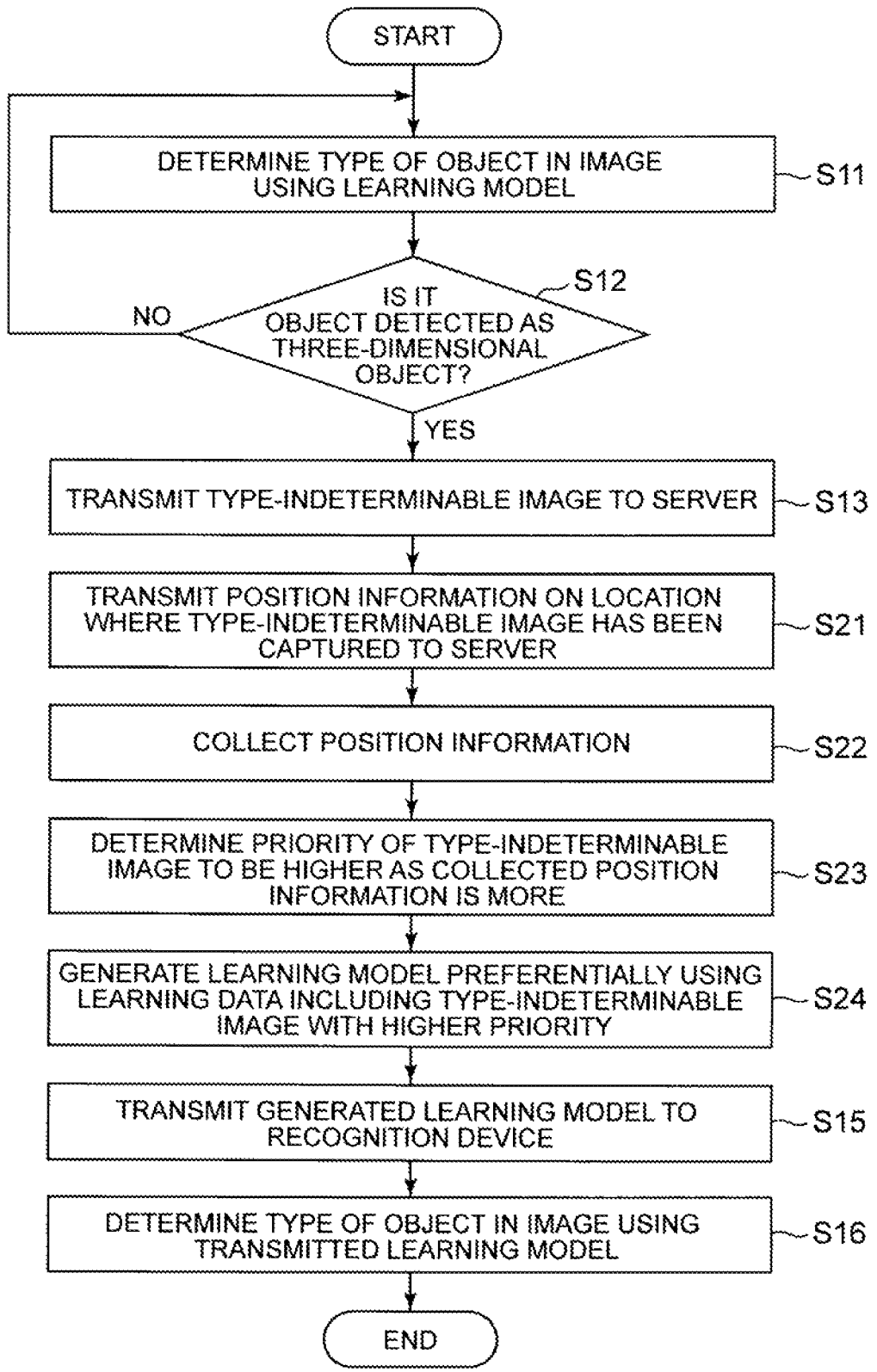
FIG. 10 It depicts a flowchart illustrating an operation example of the object recognition system of the second exemplary embodiment.
Figure 13:
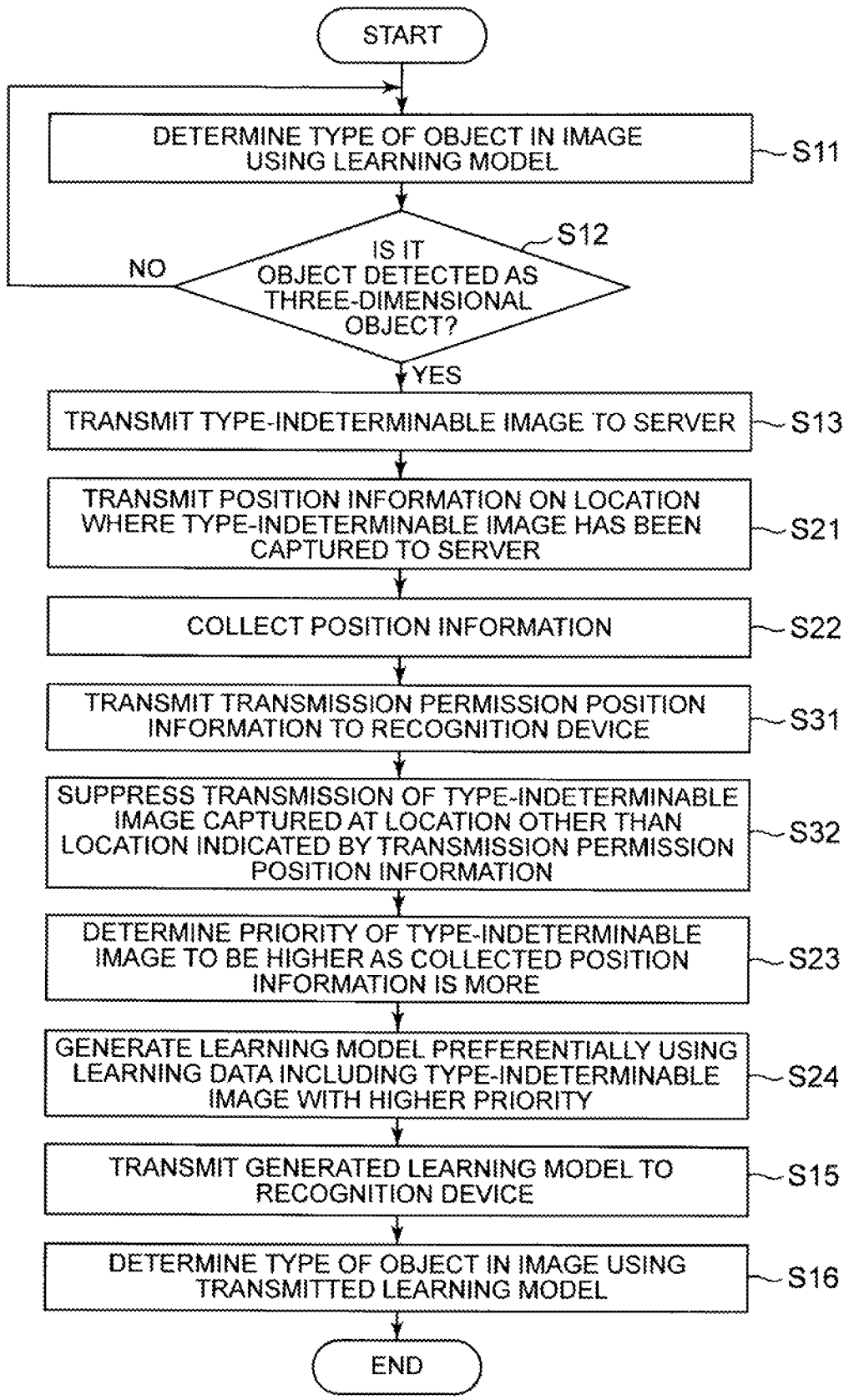
FIG. 13 It depicts a flowchart illustrating an operation example of the object recognition system of the third exemplary embodiment.

Next, an operation of the object recognition system 10b of the present exemplary embodiment will be described. FIG. 13 is a flowchart illustrating an operation example of the object recognition system 10b of the present exemplary embodiment. Processing until the server 200b receives a type-indeterminable image and position information and collects the position information is the same as the processing from Step S11 to Step S13 and from Step S21 to Step S22 illustrated in FIG. 10.

The transmission permission position information transmission unit 280 transmits position information indicating a dense location identified by the position collection unit 260 to the recognition device 100b as transmission permission position information (Step S31). The image transmission unit 142 suppresses transmission of a type-indeterminable image captured at a location other than the location indicated by the transmission permission position information to the server 200b (Step S32). Thereafter, processing until a recognition process is performed after transmission of the generated learning model to the recognition device is the same as the processing from Step S23 to Step S24 and from Step S15 to Step S16 illustrated in FIG. 10.

As described above, in the present exemplary embodiment, the position collection unit 260 collects pieces of position information in which positions are close to each other in a group and identifies the dense location of the pieces of position information, and the transmission permission position information transmission unit 280 transmits the transmission permission position information indicating the identified location to the recognition device. Then, the image transmission unit 142 of the recognition device 100b suppresses the transmission of the type-indeterminable image captured at the location other than the location indicated by the transmission permission position information to the server. Accordingly, it is possible to efficiently perform the additional learning while reducing the amount of information uploaded to the server 200b, in addition to an effect of the second exemplary embodiment.

Fourth Exemplary Embodiment

Figure 14:
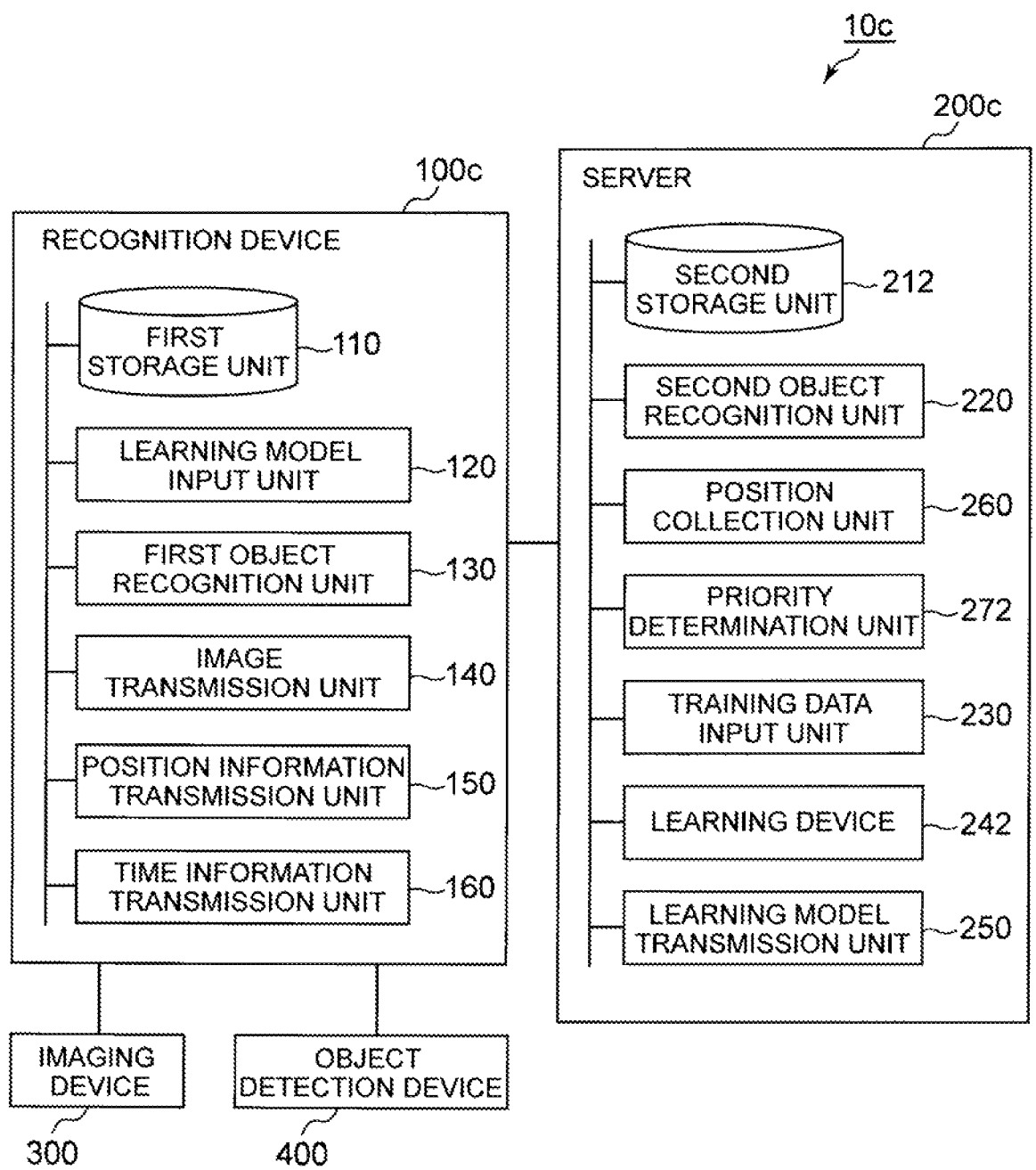
FIG. 14 It depicts a block diagram illustrating a configuration example of a fourth exemplary embodiment of the object recognition system according to the present invention.

Next, a fourth exemplary embodiment of the object recognition system according to the present invention will be described. In the fourth exemplary embodiment, a description will be given regarding a method in which a recognition device transmits information (hereinafter referred to as time information) on time when a type-indeterminable image has been captured to a server to perform additional learning. FIG. 14 is a block diagram illustrating a configuration example of the fourth exemplary embodiment of the object recognition system according to the present invention. An object recognition system 10c of the present exemplary embodiment includes a recognition device 100c and a server 200c.

The recognition device 100c includes the first storage unit 110, the learning model input unit 120, the first object recognition unit 130, the image transmission unit 140, the position information transmission unit 150, and a time information transmission unit 160. That is, the recognition device 100c of the present exemplary embodiment further includes the time information transmission unit 160 as compared with the recognition device 100a of the second exemplary embodiment. The other configurations are the same as those in the second exemplary embodiment. Note that when the server 200c transmits transmission permission position information in the third exemplary embodiment, the image transmission unit 140 may be realized as the image transmission unit 142 in the third exemplary embodiment.

The time information transmission unit 160 transmits time information indicating the time when the type-indeterminable image has been captured to the server 200c. Note that, instead of the time information transmission unit 160, the image transmission unit 140 may transmit the time information to the server 200c together with the type-indeterminable image. In this case, the recognition device 100c does not necessarily include the time information transmission unit 160.

FIG. 15 is an explanatory view illustrating another example of information transmitted to the server. The information illustrated in FIG. 15 indicates that, date and time when each type-indeterminable image has been captured are associated with the information illustrated in FIG. 8.

The server 200c includes a second storage unit 212, the second object recognition unit 220, the training data input unit 230, the learning device 242, the learning model transmission unit 250, the position collection unit 260, and a priority determination unit 272. That is, the server 200c of the present exemplary embodiment includes the second storage unit 212 and the priority determination unit 272, instead of the second storage unit 210 and the priority determination unit 270, as compared with the server 200a of the second exemplary embodiment. The other configurations are the same as those in the second exemplary embodiment. Note that the server 200c may include the transmission permission position information transmission unit 280 according to the third exemplary embodiment.

The second storage unit 212 stores a priority policy of learning based on time information. In addition, the second storage unit 212 may store the time information transmitted from the recognition device 100c. The priority policy is a policy that defines a method for determining a priority of an image used for learning, and is a policy that is defined based on a duration of the time when the image has been captured. The priority policy may be, for example, a policy that defines setting a high-priority flag according to the duration of each time when the type-indeterminable image has been captured at a dense location.

FIG. 16 is an explanatory view illustrating an example of the priority policy. The priority policy illustrated in FIG. 16 indicates that a duration of time information of a type-indeterminable image for which a high-priority flag is set is defined according to an aim of learning. For example, a user desires that a variable object be preferentially learned. It is considered that type-indeterminable images capturing the variable object are captured and transmitted from each vehicle at short intervals. Therefore, it is preferable to define a priority policy 31 in which a duration of time information is short (for example, one minute or the like) in such a case. On the other hand, for example, the user desires that a stationary object be preferentially learned. It is considered that type-indeterminable images capturing the stationary object are captured and transmitted from each vehicle for a long period of time. Therefore, it is preferable to define a priority policy 32 having a long duration of time information (for example, three days).

The priority determination unit 272 determines a priority to be set for an image captured at a location (that is, dense location) where type-indeterminable images have been captured more than a predeterminable standard according to the identified priority policy. Specifically, the priority determination unit 272 calculates a duration of time information belonging to a single dense location (group). The priority determination unit 272 may calculate a variation of time information as the duration, for example. Then, the priority determination unit 272 sets a high-priority flag for a type-indeterminable image according to the calculated duration and the priority policy.

The learning device 242 generates a learning model preferentially using the training data including the type-indeterminable image with a higher priority. Specifically, the learning device 242 preferentially selects a type-indeterminable image for which a higher-priority flag has been set, and performs additional learning. Note that the training data input unit 230 may control the training data input to the learning device 242 according to the priority.

Figure 17:
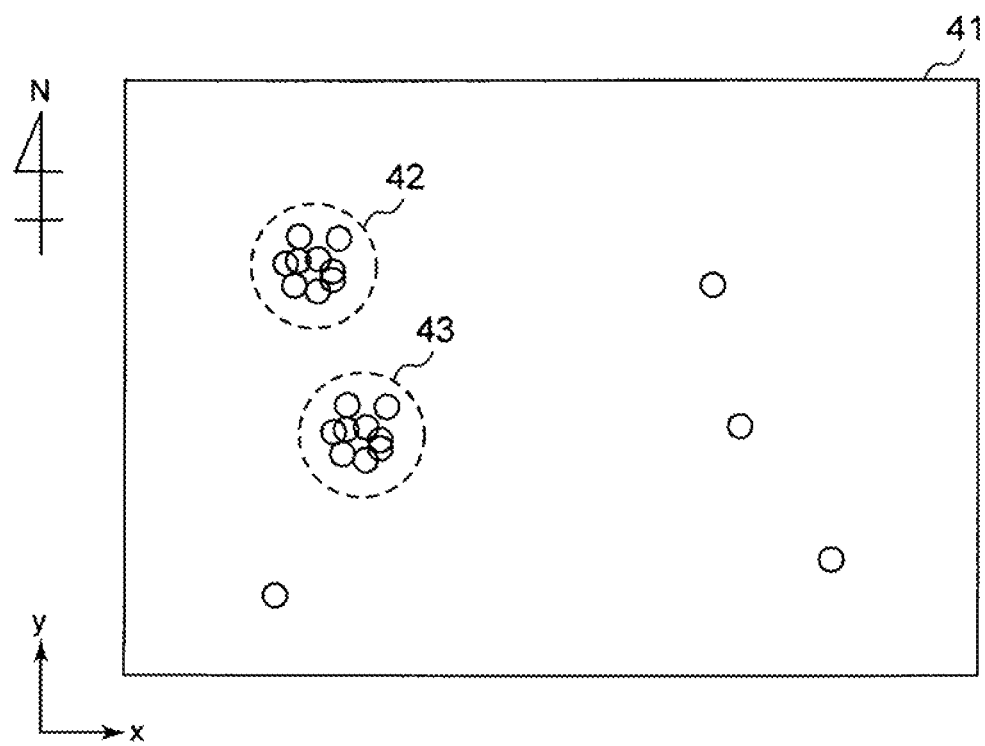
FIG. 17 It depicts an explanatory view illustrating an example of collected position information.

FIG. 17 is an explanatory view illustrating an example of collected position information. A rectangle 41 illustrated in FIG. 17 is an image of a map which two-dimensionally represents positions of objects whose types have not been determined, and a circle in the rectangle 41 indicates a position where an object whose type has not been determined has been detected (that is, a position where a type-indeterminable image has been captured), which is similar to FIG. 9. In addition, it is assumed that pieces of position information are mainly collected into two groups of a group 42 and a group 43 in the example illustrated in FIG. 17.

In the example illustrated in FIG. 17, it is assumed that a duration of time information corresponding to position information belonging to the group 42 is one minute, and a duration of time information corresponding to position information belonging to the group 43 is three days. For example, when the priority policy 31 illustrated in FIG. 16 is defined, the priority determination unit 272 may set a high-priority flag for a type-indeterminable image identified by the position information included in the group 42. In addition, for example, when the priority policy 32 illustrated in FIG. 16 is defined, the priority determination unit 272 may set a high-priority flag for a type-indeterminable image identified by the position information included in the group 43.

The learning model input unit 120, the first object recognition unit 130, the image transmission unit 140, the position information transmission unit 150, and the time information transmission unit 160 are realized by a CPU which is a computer that operates according to a program (object recognition program). In addition, the second object recognition unit 220, the training data input unit 230, the learning device 242, the learning model transmission unit 250, the position collection unit 260, and the priority determination unit 272 are realized by a CPU which is a computer that operates according to a program (re-learning program).

Figure 18:
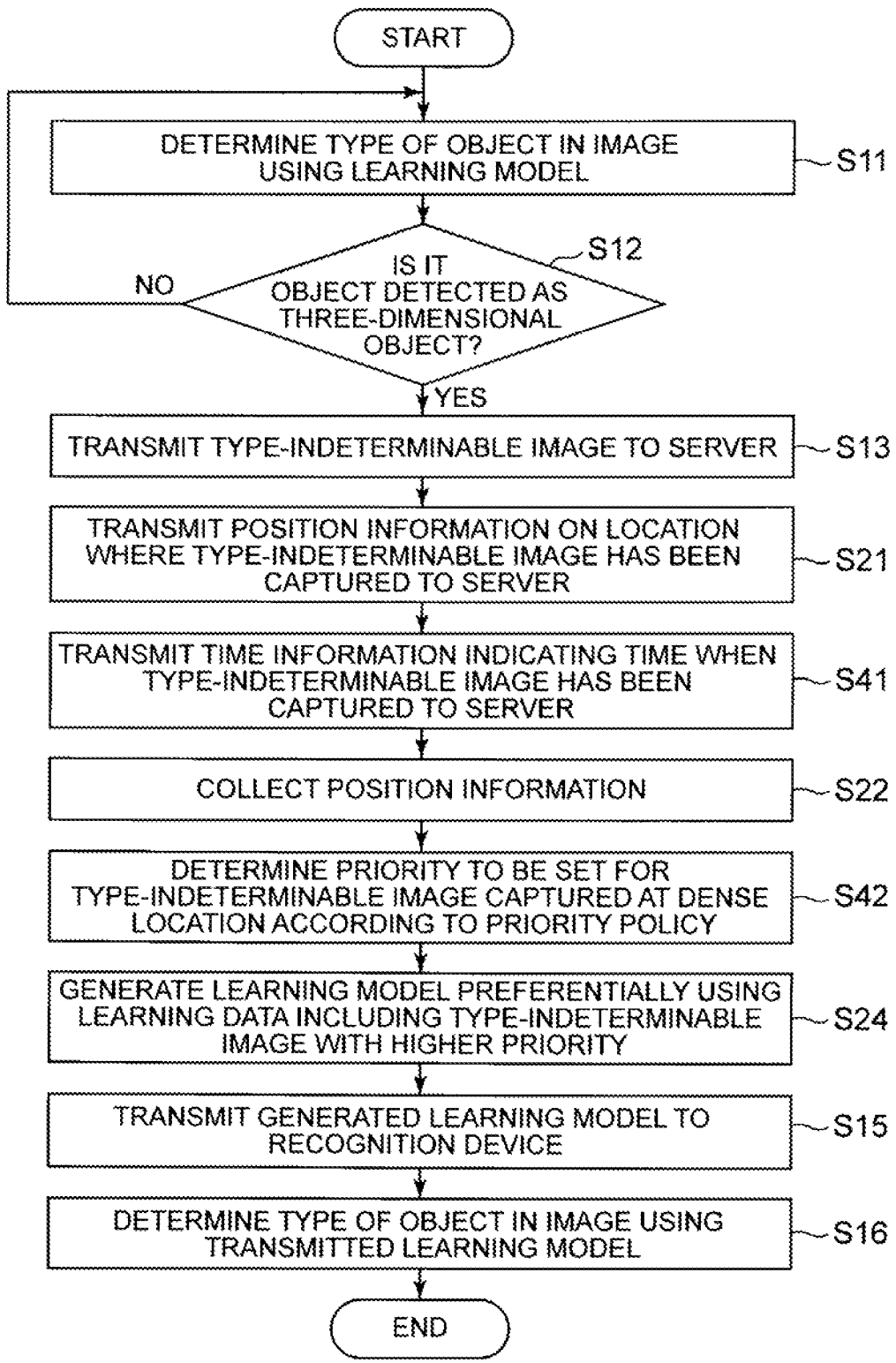
FIG. 18 It depicts a flowchart illustrating an operation example of the object recognition system of the fourth exemplary embodiment.

Next, an operation of the object recognition system 10c of the present exemplary embodiment will be described. FIG. 18 is a flowchart illustrating an operation example of the object recognition system 10c of the present exemplary embodiment. Processing until a type-indeterminable image and position information are transmitted to the server 200c is the same as the processing from Step S11 to Step S13 and Step S21 illustrated in FIG. 10. In the present exemplary embodiment, the time information transmission unit 160 further transmits time information indicating time when the type-indeterminable image has been captured to the server 200c (Step S41). Then, a process of collecting the position information by the position collection unit 260 is the same as that in Step S22 illustrated in FIG. 10.

The priority determination unit 272 determines a priority to be set for a type-indeterminable image captured at a dense location according to a priority policy (Step S42). The learning device 242 generates a learning model preferentially using the training data including the type-indeterminable image with a higher priority (Step S24). Thereafter, processing until a recognition process is performed after transmission of a generated learning model to a recognition device is the same as the processing from Step S15 to Step S16 illustrated in FIG. 10.

As described above, in the present exemplary embodiment, the time information transmission unit 160 of the recognition device 100c transmits the time information indicating the time when the type-indeterminable image has been captured to the server 200c, and the priority determination unit 272 of the server 200c determines the priority to be set for the type-indeterminable image captured at the dense location according to the priority policy. Accordingly, it is possible to select an object to be additionally learned according to the degree of temporal appearance of the object whose type is indeterminable, in addition to the effects of the above-described exemplary embodiment.

Fifth Exemplary Embodiment

Next, a fifth exemplary embodiment of the object recognition system according to the present invention will be described. In the fifth exemplary embodiment, a description will be given regarding a method of increasing the amount of data for learning an object whose type has not been determined is detected to improve the efficiency of learning by a learning device when the object is detected.

Figure 19:
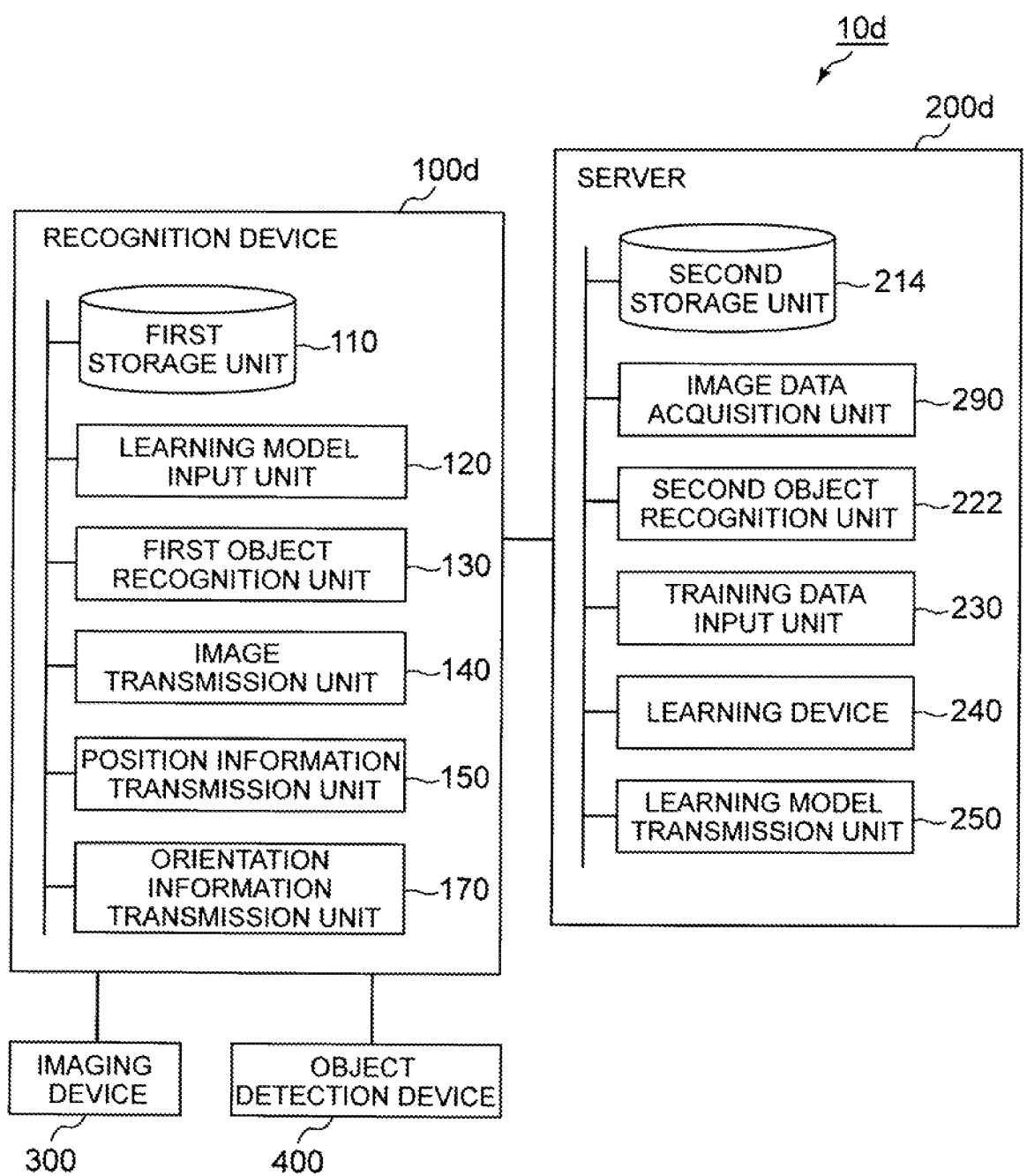
FIG. 19 It depicts a block diagram illustrating a configuration example of a fifth exemplary embodiment of the object recognition system according to the present invention.

FIG. 19 is a block diagram illustrating a configuration example of the fifth exemplary embodiment of the object recognition system according to the present invention. An object recognition system 10d of the present exemplary embodiment includes a recognition device 100d and a server 200d.

The recognition device 100d includes the first storage unit 110, the learning model input unit 120, the first object recognition unit 130, the image transmission unit 140, the position information transmission unit 150, and an orientation information transmission unit 170. That is, the recognition device 100d of the present exemplary embodiment further includes the position information transmission unit 150 and the orientation information transmission unit 170 as compared with the recognition device 100 of the first exemplary embodiment. The other configurations are the same as those in the first exemplary embodiment. Note that the recognition device 100d may include the time information transmission unit 160 of the fourth exemplary embodiment.

The position information transmission unit 150 transmits a position information on a location where an image of an object whose type has not been determined has been captured (that is, the location where a type-indeterminable image has been captured) to the server 200d, which is similar to the position information transmission unit 150 of the second exemplary embodiment.

The orientation information transmission unit 170 transmits orientation information indicating an orientation in which the type-indeterminable image has been captured to the server 200d. The orientation information is acquired by, for example, a compass (not illustrated) that detects an orientation in which the imaging device 300 captures an image, and is input to the orientation information transmission unit 170.

The server 200*d* includes a second storage unit 214, a second object recognition unit 222, the training data input unit 230, the learning device 240, the learning model transmission unit 250, and an image data acquisition unit 290. That is, the server 200*d* of the present exemplary embodiment further includes the image data acquisition unit 290 as compared with the server 200 of the first exemplary embodiment, and includes the second storage unit 214 and the second object recognition unit 222, instead of the second storage unit 210 and the second object recognition unit 220. The other configurations are the same as those in the first exemplary embodiment. Note that the server 200*d* may include the position collection unit 260 and the priority determination unit 270 described in the above-described exemplary embodiments.

The second storage unit 214 stores an image database capable of identifying a landscape image based on position information and orientation information. The image database stores an image captured with position information by an unmanned aerial vehicle, an image captured with position information by a landscape capturing vehicle, and the like.

The image data acquisition unit 290 acquires an image identified by the received position information and orientation information from the image database, and inputs the acquired image (hereinafter referred to as a database image) to the second object recognition unit 222. Note that examples of service for acquiring such an image include Street View (registered trademark) and the like.

The image identified by the image data acquisition unit 290 is an image captured at the same location as an image captured by the imaging device 300 (that is, a type-indeterminable image) at different time. Therefore, there is a high probability that objects included in the captured images are the same. Since the images capturing the objects, which are likely to be the same, are acquired in this manner, it is possible to prepare a plurality of pieces of image data for an object whose type has not been determined.

The second object recognition unit 222 determines a type of an object in a type-indeterminable image received from the recognition device 100 and a type of an object in a database image using a learning model stored in the second storage unit 210.

The training data input unit 230 inputs, to the learning device 240, training data in which the type-indeterminable image is associated with a determination result obtained by the second object recognition unit 222, and training data in which the database image is associated with the determination result obtained by the second object recognition unit 222. Note that the training data input unit 230 may input training data in which a correct label is manually assigned to each image similarly to the first exemplary embodiment.

The learning device 240 generates a learning model based on training data in which a teacher label is assigned to the type-indeterminable image and training data in which a teacher label is assigned to the database image. A method by which the learning device 240 performs learning is the same as that in the first exemplary embodiment.

The learning model input unit 120, the first object recognition unit 130, the image transmission unit 140, the position information transmission unit 150, and the orientation information transmission unit 170 are realized by a CPU which is a computer that operates according to a program (object recognition program). In addition, the second object recognition unit 222, the training data input unit 230, the learning device 240, the learning model transmission unit 250, and the image data acquisition unit 290 are realized by a CPU which is a computer that operates according to a program (re-learning program).

Figure 20:
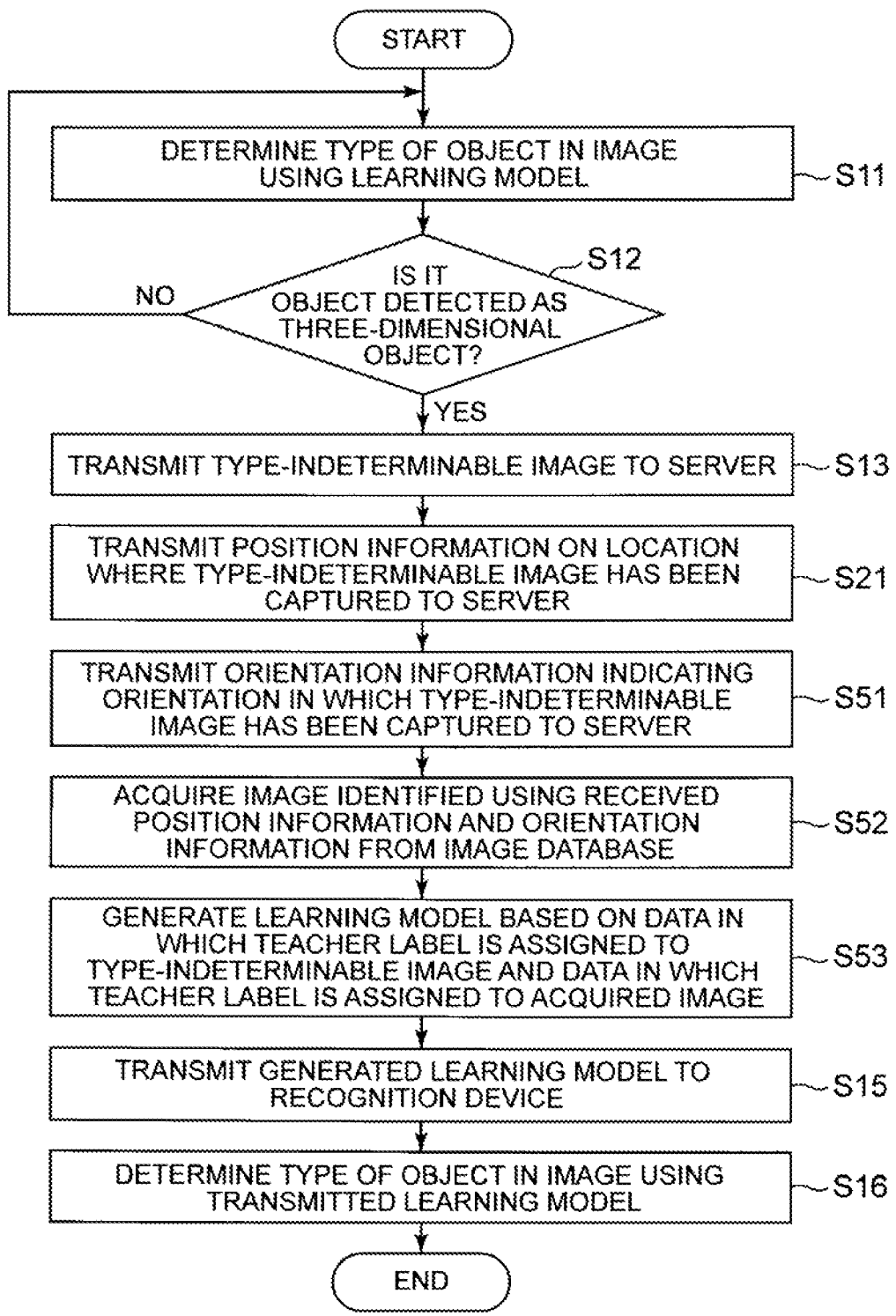
FIG. 20 It depicts a flowchart illustrating an operation example of the object recognition system of the fifth exemplary embodiment.

Next, an operation of the object recognition system 10*d* of the present exemplary embodiment will be described. FIG. 20 is a flowchart illustrating an operation example of the object recognition system 10*d* of the present exemplary embodiment. The processing until transmission of a type-indeterminable image to the server is the same as the processing from Step S11 to Step S13 illustrated in FIG. 5. In the present exemplary embodiment, the position information transmission unit 150 further transmits position information on a location where a type-indeterminable image has been captured to the server 200*c* (Step S21), and the orientation information transmission unit 170 transmits orientation information indicating an orientation in which the type-indeterminable image has been captured to the server (Step S51). The image data acquisition unit 290 acquires an image identified by the received position information and orientation information from the image database (Step S52).

The learning device 240 generates a learning model based on the training data in which the type-indeterminable image is associated with the determination result obtained by the second object recognition unit 222, and the training data in which the database image is associated with the determination result obtained by the second object recognition unit 222, which are input by the training data input unit 230 (Step S53). Thereafter, the processing until a recognition process is performed after transmission of the generated learning model to the recognition device is the same as the processing from Step S15 to Step S16 illustrated in FIG. 5.

As described above, in the present exemplary embodiment, the position information transmission unit 150 of the recognition device 100*d* transmits the position information on the location where the type-indeterminable image has been captured to the server, and the orientation information transmission unit 170 transmits the orientation information indicating the orientation in which the type-indeterminable image has been captured to the server. In addition, the image data acquisition unit 290 acquires the image identified by the received position information and orientation information from the image database. Then, the learning device 240 generates the learning model based on the training data in which the type-indeterminable image is associated with the determination result and the training data in which the database image is associated with the determination result. Accordingly, the image of the image database can be used for learning in addition to an image captured by a host vehicle so that the learning model can be made highly accurate, in addition to the effect of the first exemplary embodiment.

Sixth Exemplary Embodiment

Next, a sixth exemplary embodiment of the object recognition system according to the present invention will be described. In the sixth exemplary embodiment, a method for acquiring a more appropriate image from the image database described in the fifth exemplary embodiment will be described.

Figure 21:
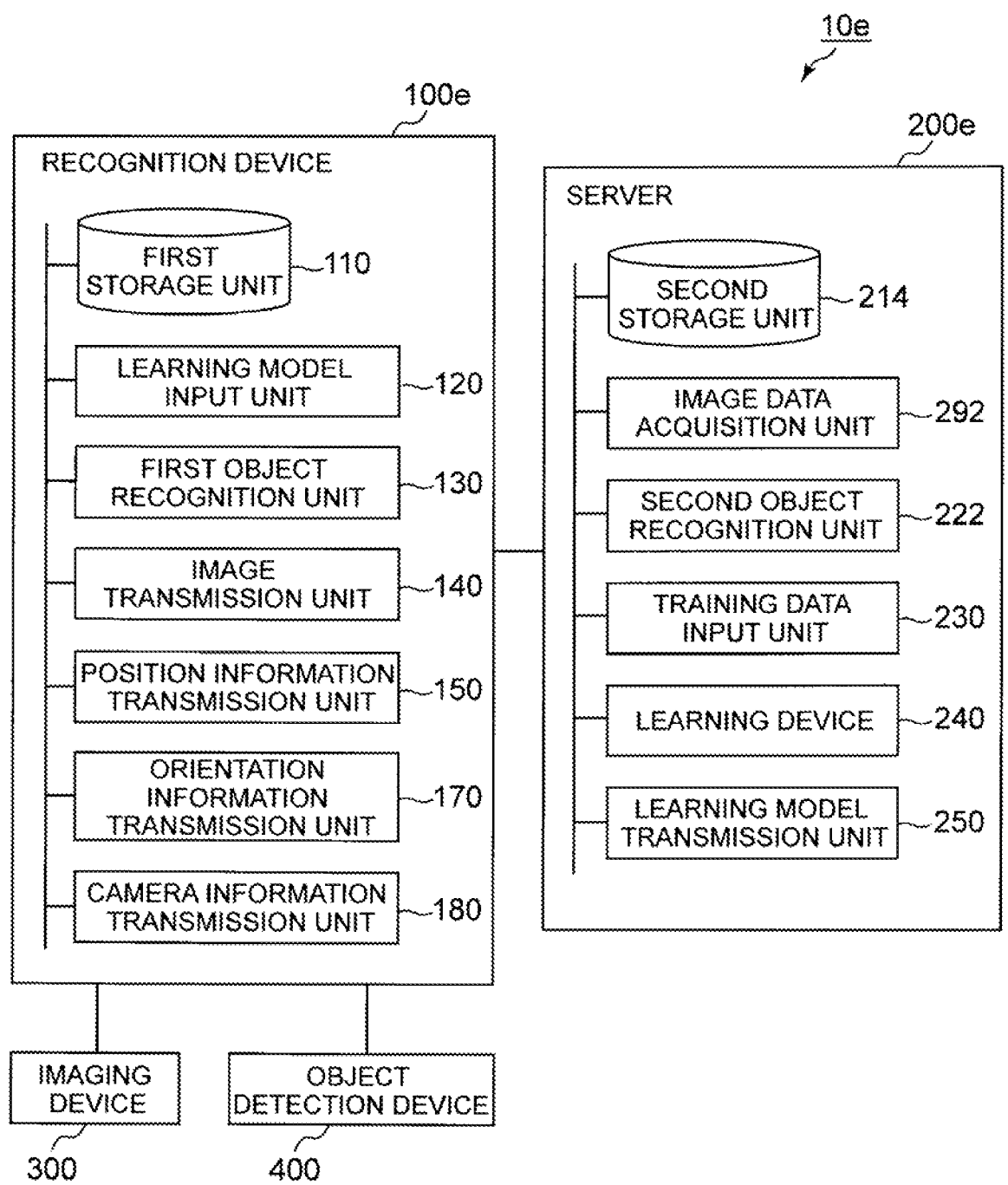
FIG. 21 It depicts a block diagram illustrating a configuration example of a sixth exemplary embodiment of the object recognition system according to the present invention.

FIG. 21 is a block diagram illustrating a configuration example of the sixth exemplary embodiment of the object recognition system according to the present invention. An object recognition system 10e of the present exemplary embodiment includes a recognition device 100e and a server 200e.

The recognition device 100e includes the first storage unit 110, the learning model input unit 120, the first object recognition unit 130, the image transmission unit 140, the position information transmission unit 150, the orientation information transmission unit 170, and a camera information transmission unit 180. That is, the recognition device 100e of the present exemplary embodiment further includes the camera information transmission unit 180 as compared with the recognition device 100d of the fifth exemplary embodiment. The other configurations are the same as those in the fifth exemplary embodiment.

The camera information transmission unit 180 transmits a camera parameter related to the imaging device 300 to the server 200e. That is, the camera information transmission unit 180 transmits the camera parameter related to the imaging device that has captured a type-indeterminable image to the server 200e. Examples of the camera parameter include a camera height, a focal length, and the like. However, the camera parameter is not limited to the camera height and the focal length, and includes contents of arbitrary parameters that can be set in the imaging device 300.

The server 200e includes the second storage unit 214, the second object recognition unit 222, the training data input unit 230, the learning device 240, the learning model transmission unit 250, and an image data acquisition unit 292. That is, the server 200e of the present exemplary embodiment includes the image data acquisition unit 292, instead of the image data acquisition unit 290, as compared with the server 200d of the fifth exemplary embodiment. The other configurations are the same as those in the fifth exemplary embodiment.

The image data acquisition unit 292 acquires an image identified by the received position information and orientation information from the image database, which is similar to the image data acquisition unit 290 in the fifth exemplary embodiment. Then, the image data acquisition unit 292 corrects a database image based on the received camera parameter. With the correction, it becomes possible to make the image acquired from the image database approximate to an image actually captured by the imaging device 300. Note that a method for correcting the image based on the camera parameter is widely known, and the detailed description thereof will be omitted here.

The learning model input unit 120, the first object recognition unit 130, the image transmission unit 140, the position information transmission unit 150, the orientation information transmission unit 170, and the camera information transmission unit 180 are realized by a CPU which is a computer that operates according to a program (object recognition program). In addition, the second object recognition unit 222, the training data input unit 230, the learning device 240, the learning model transmission unit 250, and the image data acquisition unit 292 are realized by a CPU which is a computer that operates according to a program (re-learning program).

Figure 22:
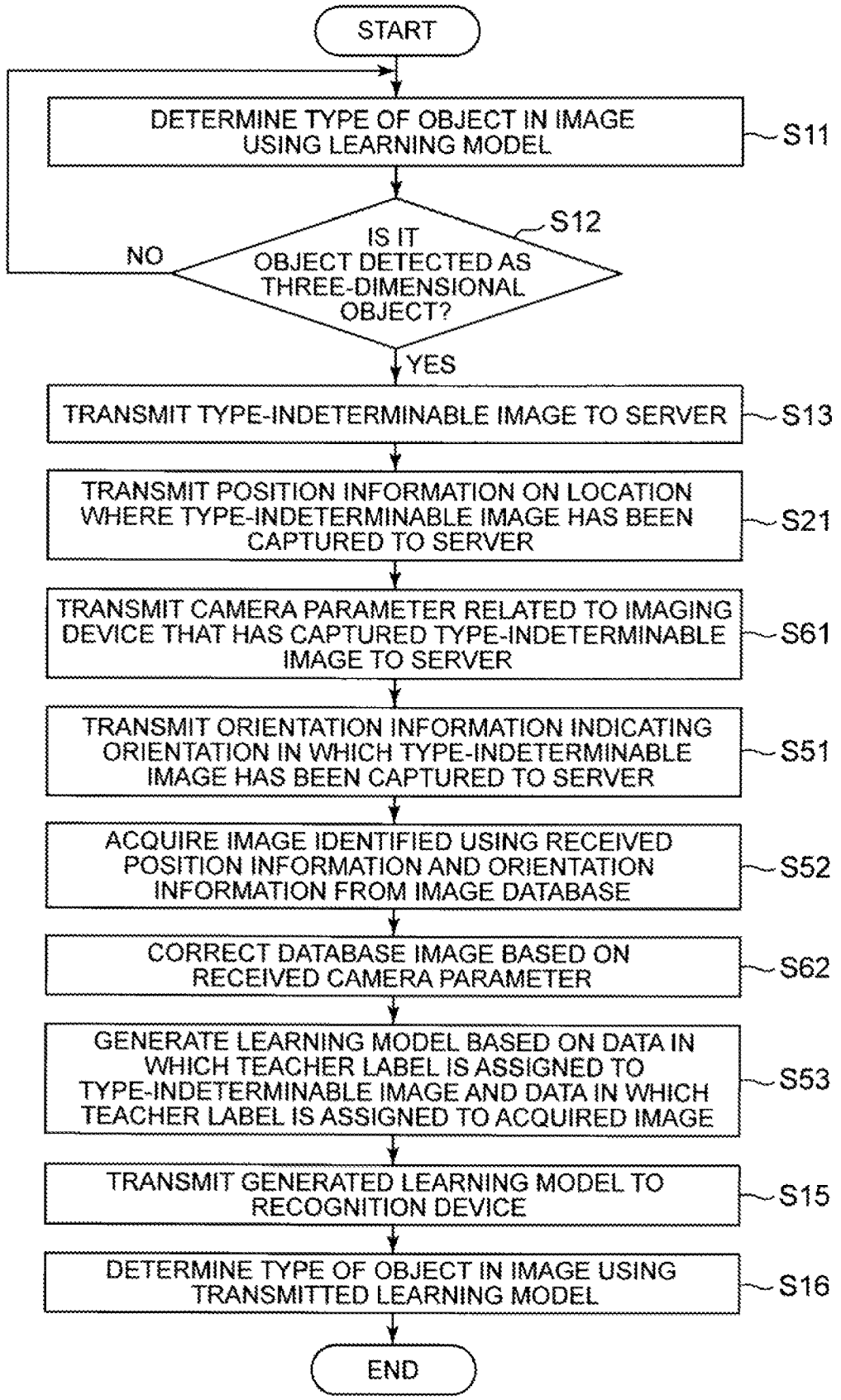
FIG. 22 It depicts a flowchart illustrating an operation example of the object recognition system of the sixth exemplary embodiment.

Next, an operation of the object recognition system 10e of the present exemplary embodiment will be described. FIG. 22 is a flowchart illustrating an operation example of the object recognition system 10e of the present exemplary embodiment. Processing until a type-indeterminable image and position information are transmitted to the server is the same as the processing from Step S11 to Step S13 and Step S21 illustrated in FIG. 20. Further, in the present exemplary embodiment, the camera information transmission unit 180 transmits the camera parameter related to the imaging device that has captured the type-indeterminable image to the server 200e (Step S61).

Thereafter, processing until the image is acquired from the image database is performed in the server 200e in the same manner as the processing from Step S51 to Step S52 illustrated in FIG. 20. Then, the image data acquisition unit 292 corrects a database image based on the received camera parameter (Step S62). Thereafter, learning model generation processing and processing until a recognition process is performed after transmission of the generated learning model to the recognition device are the same as the processing in Step S53 and from Step S15 to Step S16 illustrated in FIG. 20.

As described above, in the present exemplary embodiment, the camera information transmission unit 180 of the recognition device 100e transmits the camera parameter related to the imaging device 300 that has captured the type-indeterminable image to the server 200e, and the image data acquisition unit 292 corrects the image acquired from the image database based on the received camera parameter. Accordingly, the image acquired from the image database can be made to approximate to capturing conditions in the actual vehicle so that a learning effect by the image database can be improved, in addition to the effect of the fifth exemplary embodiment.

Figure 23:
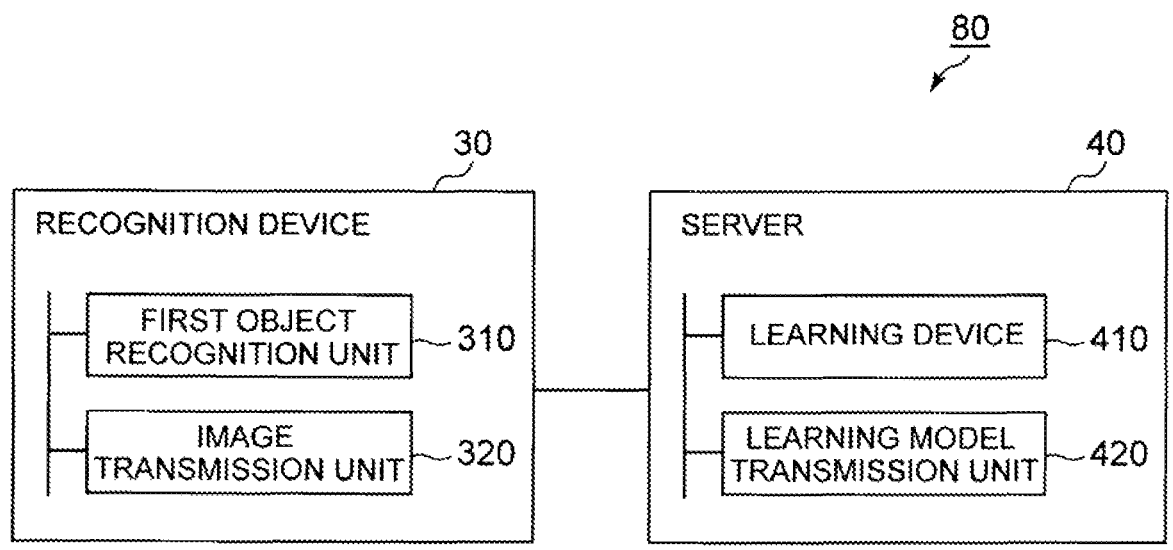
FIG. 23 It depicts a block diagram illustrating an outline of the object recognition system according to the present invention.

Next, an outline of the present invention will be described. FIG. 23 is a block diagram illustrating an outline of the object recognition system according to the present invention. An object recognition system 80 (for example, object recognition system 10) according to the present invention includes a recognition device 30 (for example, recognition device 100) that recognizes an object in an image, and a server 40 (for example, server 200) that generates a learning model.

The recognition device 30 includes: a first object recognition unit 310 (for example, first object recognition unit 130) that determines a type of the object in the image using the learning model (for example, "learning model 1"); and an image transmission unit 320 (for example, image transmission unit 140) that transmits a type-indeterminable image, which is an image in which the type has not been determined, to the server 40 when an object included in the type-indeterminable image is an object detected as a three-dimensional object.

The server 40 includes: a learning device 410 (for example, learning device 240) that generates a learning model (for example, "learning model 1a") based on training data in which a teacher label is assigned to the type-indeterminable image; and a learning model transmission unit 420 (for example, learning model transmission unit 250) that transmits the generated learning model to the recognition device 30.

Then, the first object recognition unit 310 of the recognition device 30 determines the type of the object in the image using the transmitted learning model (for example, "learning model 1a").

With such a configuration, the recognition accuracy of the object whose type is indeterminable can be improved when the object is detected.

In addition, the server 40 may include a second object recognition unit (for example, second object recognition unit 220) that determines the type of the object in the type-indeterminable image received from the recognition device 30 using a learning model (for example, "learning model 2") with higher recognition accuracy than the learning model used by the first object recognition unit 310. According to such a configuration, it is possible to automate determination processing after transmission of the type-indeterminable image.

In addition, the recognition device 30 (for example, recognition device 100a) may include the position information transmission unit 150 that transmits position information indicating a location where the type-indeterminable image has been captured to the server. In addition, the server 40 (for example, server 200a) may include: a position collection unit (for example, position collection unit 260) that collects the received position information; and a priority determination unit (for example, priority determination unit 270) that determines a priority of the type-indeterminable image captured at the location indicated by the position information to be higher as the collected position information is more. Then, the learning device 410 may generate the learning model preferentially using training data including a type-indeterminable image with a higher priority. According to such a configuration, it is possible to reduce a frequency of additional learning of an object whose type has not been determined accidentally, and to preferentially learn an object whose type has not been determined by a plurality of vehicles.

In addition, the server 40 (for example, server 200b) may include a transmission permission position information transmission unit (for example, transmission permission position information transmission unit 280) that transmits transmission permission position information, which is position information indicating a capturing location of a type-indeterminable image for which transmission to the server 40 is permitted, to the recognition device 30. Then, the position collection unit may collect pieces of position information in which positions are close to each other in a group, and identify a dense location which is a location where type-indeterminable images have been captured more than a predetermined standard, and the transmission permission position information transmission unit may transmit information indicating the identified dense location to the recognition device as the transmission permission position information. Then, the image transmission unit 320 (for example, image transmission unit 142) of the recognition device 30 may suppress transmission of a type-indeterminable image captured at a location other than the location indicated by the transmission permission position information to the server. With such a configuration, it is possible to efficiently perform additional learning while reducing the amount of information uploaded to the server.

In addition, the recognition device 30 (for example, recognition device 100c) may include a time information transmission unit (for example, time information transmission unit 160) that transmits time information indicating time when a type-indeterminable image has been captured to the server. The priority determination unit may determine a priority to be set for the type-indeterminable image captured at the dense location according to a priority policy which is a policy that defines a method for determining a priority of an image used for learning, and is a policy that is defined based on a duration of time when the image has been captured. According to such a configuration, it is possible to select an object to be additionally learned according to the degree of temporal appearance of the object whose type is indeterminable.

In addition, the recognition device 30 (for example, recognition device 100d) may include: a position information transmission unit (for example, position information transmission unit 150) that transmits position information on a location where a type-indeterminable image has been captured to the server; and an orientation information transmission unit (for example, orientation information transmission unit 170) that transmits orientation information indicating an orientation in which the type-indeterminable image has been captured to the server. In addition, the server 40 (for example, server 200d) may include an image data acquisition unit (for example, image data acquisition unit 292) that acquires an image identified using the received position information and orientation information from an image database capable of identifying an image based on the position information and the orientation information. The learning device 410 may generate a learning model based on training data in which a teacher label is assigned to the image acquired by the image data acquisition unit. According to such a configuration, the image of the image database can be used for learning in addition to an image captured by a host vehicle so that the learning model can be made highly accurate.

Figure 24:
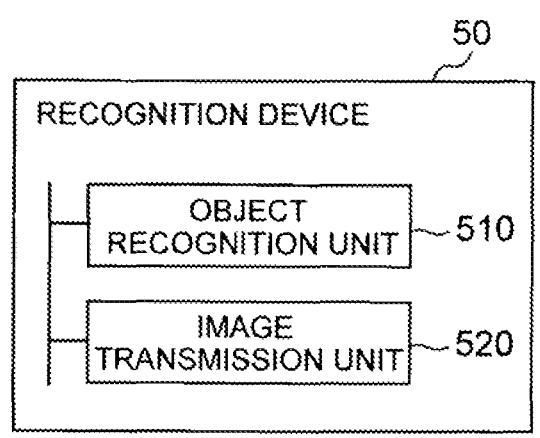
FIG. 24 It depicts a block diagram illustrating an outline of a recognition device according to the present invention.

FIG. 24 is a block diagram illustrating an outline of a recognition device according to the present invention. A recognition device 50 (for example, the recognition device 100) according to the present invention includes an object recognition unit 510 and an image transmission unit 520. Note that contents of the object recognition unit 510 and the image transmission unit 520 are the same as those of the first object recognition unit 310 and the image transmission unit 320 of the recognition device 30 illustrated in FIG. 23. Even with such a configuration, the recognition accuracy of the object whose type is indeterminable can be improved when the object is detected.

Some or all of the exemplary embodiments disclosed above can be described also as the following supplementary notes, but are not limited thereto.

(Supplementary note 1) An object recognition system including: a recognition device that recognizes an object in a captured image; and a server that generates a learning model, wherein the recognition device includes a first object recognition unit that determines a type of the object in the image using the learning model, and an image transmission unit that transmits a type-indeterminable image, which is an image in which the type has not been determined, to the server when the object included in the type-indeterminable image is an object detected as a three-dimensional object; the server includes a learning device that generates a learning model based on training data in which a teacher label is attached to the type-indeterminable image, and a learning model transmission unit that transmits the generated learning model to the recognition device; and the first object recognition unit of the recognition device determines the type of the object in the image using the transmitted learning model.

(Supplementary note 2) The object recognition system according to Supplementary note 1, wherein the server includes a second object recognition unit that determines the type of the object in the type-indeterminable image received from the recognition device using a learning model with higher recognition accuracy than the learning model used by the first object recognition unit.

(Supplementary note 3) The object recognition system according to Supplementary note 1 or 2, wherein the recognition device includes a position information transmission unit that transmits position information indicating a location where a type-indeterminable image has been captured to the server; the server includes a position collection unit that collects the received position information, and a priority determination unit that determines a priority of the type-indeterminable image captured at the location indicated by the position information to be higher as the collected position information is more; and the learning device generates a learning model preferentially using training data including a type-indeterminable image with a higher priority.

(Supplementary note 4) The object recognition system according to Supplementary note 3, wherein the server includes a transmission permission position information transmission unit that transmits, to the recognition device, transmission permission position information, which is position information indicating a capturing location of a type-indeterminable image for which transmission to the server is permitted; the position collection unit collects pieces of position information in which positions are close to each other in a group, and identifies a dense location which is a location where type-indeterminable images have been captured more than a predetermined standard; the transmission permission position information transmission unit transmits information indicating the identified dense location to the recognition device as the transmission permission position information; and the image transmission unit of the recognition device suppresses transmission of a type-indeterminable image captured at a location other than the location indicated by the transmission permission position information to the server.

(Supplementary note 5) The object recognition system according to Supplementary note 3 or 4, wherein the recognition device includes a time information transmission unit that transmits time information indicating time when a type-indeterminable image has been captured to the server; and the priority determination unit determines a priority to be set for the type-indeterminable image captured at the dense location according to a priority policy which is a policy that defines a method for determining a priority of an image used for learning, and is a policy that is defined based on a duration of time when the image has been captured.

(Supplementary note 6) The object recognition system according to any one of Supplementary notes 1 to 5, wherein the recognition device includes a position information transmission unit that transmits position information on a location where a type-indeterminable image has been captured to the server, and an orientation information transmission unit that transmits orientation information indicating an orientation in which the type-indeterminable image has been captured to the server; the server includes an image data acquisition unit that acquires an image identified using the received position information and orientation information from an image database capable of identifying an image based on the position information and the orientation information; and the learning device generates a learning model based on training data in which a teacher label is assigned to the image acquired by the image data acquisition unit.

(Supplementary note 7) The object recognition system according to Supplementary note 6, wherein the recognition device includes a camera information transmission unit that transmits a camera parameter related to an imaging device that has captured the type-indeterminable image to the server; and the image data acquisition unit corrects the image acquired from the image database based on the received camera parameter.

(Supplementary note 8) The object recognition system according to any one of Supplementary notes 1 to 7, wherein the image transmission unit transmits an image in which a captured image is associated with coordinate information for identifying an object whose type has not been determined in the captured image, or an image obtained by extracting a portion of the captured image including the object whose type has not been determined as a type-indeterminable image.

(Supplementary note 9) A recognition device including: an object recognition unit that determines a type of an object in an image using a learning model; and an image transmission unit that transmits a type-indeterminable image, which is an image in which the type has not been determined, to a server that generates the learning model when an object included in the type-indeterminable image is an object detected as a three-dimensional object, wherein the object recognition unit receives the learning model generated by the server based on training data in which a teacher label is assigned to the type-indeterminable image, and determines the type of the object in the image using the received learning model.

(Supplementary note 10) An object recognition method including: causing a recognition device that recognizes an object in a captured image to determine a type of the object in the image using a learning model; causing the recognition device to transmit a type-indeterminable image, which is an image in which the type has not been determined, to a server that generates the learning model when an object included in the type-indeterminable image is an object detected as a three-dimensional object; causing the server to generate a learning model based on training data in which a teacher label is assigned to the type-indeterminable image; causing the server to transmit the generated learning model to the recognition device; and causing the recognition device to determine the type of the object in the image using the transmitted learning model.

(Supplementary note 11) A learning model update method including: determining a type of an object in an image using a learning model; transmitting a type-indeterminable image, which is an image in which the type has not been determined, to a server that generates the learning model when an object in the type-indeterminable image is an object detected as a three-dimensional object; receiving the learning model generated by the server based on training data in which a teacher label is assigned to the type-indeterminable image; and determining the type of the object in the image using the received learning model.

(Supplementary note 12) An object recognition program that causes a computer to execute: an object recognition process of determining a type of an object in an image using a learning model; and an image transmission process of transmitting a type-indeterminable image, which is an image in which the type has not been determined, to a server that generates the learning model when an object included in the type-indeterminable image is an object detected as a three-dimensional object, wherein, in the object recognition process, the learning model, generated by the server based on the training data in which a teacher label is assigned to the type-indeterminable image, is received, and the type of the object in the image is determined using the received learning model.

As above, the invention of the present application has been described with reference to the exemplary embodiments and examples, but the invention of the present application is not limited to the above-described exemplary embodiments and examples. Various modifications that can be understood by the person skilled in the art can be made within a scope of the invention of the present application regarding the configuration and the details of the invention of the present application.

This application claims priority based on Japanese Patent Application Laid-Open No. 2018-207870 filed on Nov. 5, 2018, the disclosure of which is incorporated herein by reference in its entirety.

REFERENCE SIGNS LIST 10, 10a, 10b, 10c, 10d, 10e Object recognition system
100, 100a, 100b, 100c, 100d, 100e Recognition device
110 First storage unit
120 Learning model input unit
130 First object recognition unit
140, 142 Image transmission unit
150 Position information transmission unit
160 Time transmission unit
170 Orientation information transmission unit
180 Camera information transmission unit
200, 200a, 200b, 200c, 200d, 200e Server
210, 212, 214 Second storage unit
220, 222 Second object recognition unit
230 Training data input unit
240, 242 Learning device
250 Learning model transmission unit
260 Position collection unit
270, 272 Priority determination unit
280 Transmission permission position information transmission unit
290, 292 Image data acquisition unit
300 Imaging device
400 Object detection device

What is claimed is:

1. An object recognition system comprising:
a recognition device that recognizes an object in a captured image; and
a server that generates a learning model,
wherein the recognition device includes:
a first object recognition unit that determines a type of the object in the image using the learning model; and
an image transmission unit that transmits a type-indeterminable image, which is an image in which the type has not been determined, to the server when the object included in the type-indeterminable image is an object detected as a three-dimensional object,
the server includes:
a learning device that generates a learning model based on training data in which a teacher label is assigned to the type-indeterminable image; and
a learning model transmission unit that transmits the generated learning model to the recognition device, and
the first object recognition unit of the recognition device determines the type of the object in the image using the transmitted learning model.

2. The object recognition system according to claim 1, wherein
the server includes a second object recognition unit that determines the type of the object in the type-indeterminable image received from the recognition device using a learning model with higher recognition accuracy than the learning model used by the first object recognition unit.

3. The object recognition system according to claim 1, wherein
the recognition device includes a position information transmission unit that transmits position information indicating a location where a type-indeterminable image has been captured to the server,
the server includes:
a position collection unit that collects the received position information; and
a priority determination unit that determines a priority of the type-indeterminable image captured at the location indicated by the position information to be higher as the collected position information is more, and
the learning device generates a learning model preferentially using training data including a type-indeterminable image with a higher priority.

4. The object recognition system according to claim 3, wherein
the server includes a transmission permission position information transmission unit that transmits transmission permission position information, which is position information indicating a capturing location of a type-indeterminable image for which transmission to the server is permitted, to the recognition device,
the position collection unit collects pieces of position information in which positions are close to each other in a group, and identifies a dense location which is a location where type-indeterminable images have been captured more than a predetermined standard,
the transmission permission position information transmission unit transmits information indicating the identified dense location to the recognition device as the transmission permission position information, and
the image transmission unit of the recognition device suppresses transmission of a type-indeterminable image captured at a location other than the location indicated by the transmission permission position information to the server.

5. The object recognition system according to claim 3, wherein
the recognition device includes a time information transmission unit that transmits time information indicating time when a type-indeterminable image has been captured to the server, and
the priority determination unit determines a priority to be set for the type-indeterminable image captured at the dense location according to a priority policy which is a policy that defines a method for determining a priority of an image used for learning, and is a policy that is defined based on a duration of time when the image has been captured.

6. The object recognition system according to claim 1, wherein
the recognition device includes:
a position information transmission unit that transmits position information on a location where a type-indeterminable image has been captured to the server; and
an orientation information transmission unit that transmits orientation information indicating an orientation in which the type-indeterminable image has been captured to the server,
the server includes an image data acquisition unit that acquires an image identified using the received position information and orientation information from an image database capable of identifying an image based on the position information and the orientation information, and
the learning device generates a learning model based on training data in which a teacher label is assigned to the image acquired by the image data acquisition unit.

7. The object recognition system according to claim 6, wherein
the recognition device includes a camera information transmission unit that transmits a camera parameter related to an imaging device that has captured the type-indeterminable image to the server, and the image data acquisition unit corrects the image acquired from the image database based on the received camera parameter.

8. The object recognition system according to claim 1, wherein the image transmission unit transmits an image in which a captured image is associated with coordinate information for identifying an object whose type has not been determined in the captured image, or an image obtained by extracting a portion of the captured image including the object whose type has not been determined as a type-indeterminable image.

9. A recognition device comprising a hardware processor configured to execute a software code to:

determine a type of an object in an image using a learning model;

transmit a type-indeterminable image, which is an image in which the type has not been determined, to a server that generates the learning model when an object included in the type-indeterminable image is an object detected as a three-dimensional object; and receive the learning model generated by the server based on training data in which a teacher label is assigned to the type-indeterminable image, and determine the type of the object in the image using the received learning model.

10. An object recognition method comprising:

causing a recognition device that recognizes an object in a captured image to determine a type of the object in the image using a learning model;

causing the recognition device to transmit a type-indeterminable image, which is an image in which the type has not been determined, to a server that generates the learning model when an object included in the type-indeterminable image is an object detected as a three-dimensional object;

causing the server to generate a learning model based on training data in which a teacher label is assigned to the type-indeterminable image;

causing the server to transmit the generated learning model to the recognition device; and causing the recognition device to determine the type of the object in the image using the transmitted learning model.

* * * * *